United States Patent [19]
Kondo et al.

[11] Patent Number: 5,625,473
[45] Date of Patent: Apr. 29, 1997

[54] LIQUID CRYSTAL DISPLAY DEVICE WITH POLYMER WALLS AND METHOD FOR PRODUCING THE SAME

[75] Inventors: Masahiko Kondo, Kitakatsuragi-gun; Nobuaki Yamada, Higashiosaka; Shuichi Kohzaki, Nara; Yasuhiro Yamamoto, Tenri, all of Japan

[73] Assignee: Sharp Kabushiki Kaisha, Osaka, Japan

[21] Appl. No.: 234,006

[22] Filed: Apr. 28, 1994

[30] Foreign Application Priority Data

May 6, 1993 [JP] Japan ..................... 5-105744
Oct. 27, 1993 [JP] Japan ..................... 5-269251

[51] Int. Cl.⁶ ..................... G02F 1/13; G02F 1/1339
[52] U.S. Cl. ..................... 349/86; 349/153; 349/155
[58] Field of Search ..................... 359/51, 80, 81

[56] References Cited

U.S. PATENT DOCUMENTS

| | | |
|---|---|---|
| 4,596,445 | 6/1986 | Fergason . |
| 4,662,720 | 5/1987 | Fergason . |
| 5,099,343 | 3/1992 | Margerum et al. ..... 359/69 |
| 5,301,046 | 4/1994 | Konuma et al. ..... 359/51 |
| 5,357,356 | 10/1994 | Konuma et al. ..... 359/51 |
| 5,379,139 | 1/1995 | Sato et al. ..... 359/81 |
| 5,450,220 | 9/1995 | Onishi et al. ..... 359/51 |
| 5,473,450 | 12/1995 | Yamada et al. ..... 359/51 |

FOREIGN PATENT DOCUMENTS

| | | |
|---|---|---|
| 56-140321 | 11/1981 | Japan . |
| 58-501631 | 9/1983 | Japan . |
| 59-226322 | 12/1984 | Japan . |
| 61-502128 | 9/1986 | Japan . |
| 1-269922 | 10/1989 | Japan . |
| 2-99920 | 4/1990 | Japan . |
| 2-153318 | 6/1990 | Japan . |
| 2-153319 | 6/1990 | Japan . |
| 3-61925 | 3/1991 | Japan . |
| 3-278024 | 12/1991 | Japan . |
| 4-31824 | 2/1992 | Japan . |
| 4-31823 | 2/1992 | Japan . |
| 4-212928 | 8/1992 | Japan . |
| 4-338923 | 11/1992 | Japan . |
| 5-11237 | 1/1993 | Japan . |
| 5-27242 | 2/1993 | Japan . |
| WO83/01016 | 3/1983 | WIPO . |
| WO85/04262 | 9/1985 | WIPO . |

*Primary Examiner*—Wael Fahmy
*Assistant Examiner*—Fetsum Abraham
*Attorney, Agent, or Firm*—Nixon & Vanderhye P.C.

[57] ABSTRACT

A method for producing a liquid crystal display device, includes the steps of: attaching a first substrate having a counter electrode to a second substrate having a plurality of pixel electrodes provided in a matrix and active elements provided for the respective pixel electrodes so that a predetermined gap is kept between the counter electrode and the pixel electrodes; injecting a mixture including liquid crystal and photocurable resin into the gap; and irradiating light to the mixture with the pixel electrodes and the active elements non-irradiation regions, thereby forming a liquid crystal layer including liquid crystal regions surrounded by polymer walls in the respective pixel electrodes.

17 Claims, 25 Drawing Sheets

LIQUID CRYSTAL DISPLAY DEVICE WITH POLYMER WALLS AND METHOD FOR PRODUCING THE SAME

BACKGROUND OF THE INVENTION

1. Field of the Invention

The present invention relates a liquid crystal display device and a method for producing the same. In particular, the present invention relates to a liquid crystal display device having wide viewing angle characteristics and a method for producing the same.

2. Description of the Related Art

Various display modes have been used for a liquid crystal display device. For example, as liquid crystal display devices utilizing an electro-optical effect, there are twisted nematic (TN) and supertwisted nematic (STN) liquid crystal display devices using a nematic liquid crystal, which have been put into practical use; and a liquid crystal display device using a ferroelectric liquid crystal. These devices require a polarizer and alignment treatment. In addition, there are liquid crystal display devices utilizing a dynamic scattering (DS) effect or a phase change (PC) effect. These devices utilize light scattering caused by the liquid crystal and do not require polarizers.

In recent years, a polymer dispersed liquid crystal mode (PDLC mode) has been proposed. In this mode, a polarizer and alignment treatment are not required, and a transparent state and an opaque state are electrically switched utilizing the birefringenece of liquid crystal. The basic principle of the PDLC mode is as follows: The PDLC has a structure in which liquid crystal phases are dispersed in a polymer matrix. Materials for the liquid crystal and the polymer are selected so that the ordinary light refractive index of the liquid crystal is identical with the refractive index of the polymer matrix. When a voltage is applied to the PDLC, the liquid crystal molecules are oriented to display a transparent state; when no voltage is applied to the PDLC, the orientation of the liquid crystal molecules are disturbed, so that light incident upon the PDLC is scattered to display an opaque state.

Various methods for producing the PDLC are known. Japanese National Publication No. 58-5-501631 discloses the encapsulation of liquid crystal in a polymer; Japanese National Publication No. 61-502128 discloses that liquid crystal is mixed with photocurable or thermosetting resin and the resin is cured, thereby phase-separating the liquid crystal to form liquid crystal droplets in the resin; and Japanese Laid-Open Patent Publication No. 59-226322 discloses that a mixture including a polymer, liquid crystal, and a solvent for dissolving the polymer and liquid crystal is prepared, and the solvent is removed, thereby forming a phase separation of the polymer and liquid crystal.

A liquid crystal display device performing a non-scattering mode display, using the PDLC and a polarizer has also been proposed. Japanese Laid-Open Patent Publication No. 5-27242 discloses a method for producing such a liquid crystal display device: A mixture of liquid crystal and photocurable resin is irradiated with UV-rays to phase-separate the liquid crystal and the polymer, thereby forming a polymer network structure in a liquid crystal layer (i.e., a random matrix in which liquid crystal regions are arranged in a matrix in the polymer material). According to this method, the polymer network is also formed in pixels, so that transmittance and contrast are low.

In Japanese Patent Application No. 5.30996, the inventors of the present invention have proposed a method for producing a polymer dispersed liquid crystal display device as described below:

According to this method, a mixture of a liquid crystal material, photocurable resin, and photoinitiator is injected between facing substrates. A photomask is placed so as to cover pixel portions. UV-rays are irradiated to the cell under this condition. As a result, liquid crystal regions are formed in the pixel portions and a polymer is formed in the other portions. Unlike the method disclosed in Japanese Laid-Open Patent Publication No. 5.27242, since a polymer network is not formed in the pixel portions, there is no decrease in contrast characteristic. In addition, by radially or randomly arranging liquid crystal domains in the liquid crystal regions, viewing angle characteristics of the liquid crystal display device can be markedly improved.

However, the above method has a problem that a liquid crystal display device to be obtained has an insufficient contrast characteristic.

First, a common problem in a method for producing active matrix type and simple matrix type liquid crystal display devices will be considered. Unwanted light is incident upon the pixels during light irradiation to form an unwanted cured polymer in the pixels; as a result, the liquid crystal display device obtained has a low contrast characteristic. The formation of the unwanted cured polymer in the pixels is caused by the photomask which is not designed in an appropriate shape and size and by the low positioning precision between the photomask and the liquid crystal cell. Alternatively, light diffraction plays a part in the formation of the unwanted curd polymer in the pixels. More specifically, there is a distance (corresponding to the thickness of a transparent substrate) between a photomask or a light-shielding member formed on the substrate and a mixture to be subjected to light irradiation. Thus, if the pattern of the photomask or the light-shielding member is small, light, which is irradiated to the mixture of liquid crystal and a photocurable polymer sandwiched between facing substrates for producing the PDLC, is diffracted to come in the pixels. As a result, the cured polymer is formed in the pixels.

Furthermore, when the above liquid crystal display device is produced using a substrate on which an active element such as a TFT is formed, UV-rays are directly irradiated to the active element to cause the deterioration of the electronic characteristics of the active element. As a result, the contrast characteristic of the liquid crystal display device is deteriorated.

SUMMARY OF THE INVENTION

The method for producing a liquid crystal display device of this invention, comprises the steps of:

attaching a first substrate having a counter electrode to a second substrate having a plurality of pixel electrodes provided in a matrix and active elements provided for the respective pixel electrodes so that a predetermined gap is kept between the counter electrode and the pixel electrodes;

injecting a mixture including liquid crystal and photocurable resin into the gap; and irradiating light to the mixture with the pixel electrodes and the active elements non-irradiation regions, thereby forming a liquid crystal layer including liquid crystal regions surrounded by polymer walls in the respective pixel electrodes.

In one embodiment of the present invention, the liquid crystal layer is formed by placing a photomask for making the pixel electrodes and the active elements non-irradiation regions on a side of one of the first and second substrates and irradiating light to the mixture through the photomask.

In another embodiment of the present invention, one of the first substrate and the second substrate has a first light-shielding layer making the active elements non-irradiation regions and the pixel electrodes irradiation regions. The above-mentioned method comprises the steps of:

forming a second light-shielding layer on the other substrate having no first-shielding layer, the second light-shielding layer making the pixel electrodes non-irradiation regions; and irradiating light to the mixture through the second light-shielding layer.

In another embodiment of the present invention, the second light-shielding layer is formed by a photolithograph technology on the other substrate having no first light-shielding layer, using the first light-shielding layer as a mask, the second light-shielding layer making the pixel electrodes non-irradiation regions.

In another embodiment of the present invention, the first light-shielding layer is a black mask formed on the first substrate, the black mask having light-transmitting portions corresponding to the pixel electrodes.

In another embodiment of the present invention, the second substrate has a light-shielding layer making the active elements non-irradiation regions, and the liquid crystal layer is formed by placing a photomask making the pixel electrodes non-irradiation regions on a side of the substrate having the light-shielding layer and irradiating light to the mixture through the photomask.

In another embodiment of the present invention, the light-shielding layer is provided between the second substrate and the active elements.

In another embodiment of the present invention, the first substrate has a light-shielding layer making the active elements non-irradiation regions and portions including the pixel electrodes other than the active elements irradiation regions, and the liquid crystal layer is formed by placing a photomask making the pixel electrodes non-irradiation regions on a side of the first substrate and irradiating light to the mixture through the photomask.

In another embodiment of the present invention, the above-mentioned method further comprises the steps of:

forming markers on the photomask and the substrate for aligning the photomask with the substrate; and aligning the photomask with the substrate using the markers.

In another embodiment of the present invention, the markers formed on the photomask and the markers formed on the substrate have no space therebetween when the photomask is aligned to the substrate.

According to another aspect of the present invention, the liquid crystal display device of this invention comprises: a first substrate having a counter electrode; a second substrate having a plurality of pixel electrodes provided in a matrix and active elements provided for the respective pixel electrodes; and a liquid crystal layer sandwiched between the counter electrode and the pixel electrodes, the liquid crystal layer including liquid crystal regions surrounded by polymer walls in the respective pixel electrodes, wherein a light-shielding layer making the active elements non-irradiation regions is provided between the second substrate and the active elements.

Alternatively, the liquid crystal display device of this invention comprises a pair of facing substrates and a liquid crystal layer sandwiched between the pair of substrates, electrodes provided on each liquid crystal layer side of the pair of substrates forming a plurality of pixels arranged in a matrix, the liquid crystal layer being formed by irradiating light from a side of one of the substrates to a mixture including liquid crystal and photocurable resin, the liquid crystal layer including liquid crystal regions surrounded by polymer walls in the respective pixels, wherein a parameter a represented by the following formula, using the minimum value d among distances between the pixels and widths of the pixels, a thickness z of the substrate on a side of the light irradiation, and a predetermined wavelength $\lambda$ of light in the substrate, is at least 1:

$$a=\{2/(\lambda \cdot z)\}^{1/2} \cdot d$$

In one embodiment of the present invention, one of the pair of substrates further includes active elements in the respective pixels.

In another embodiment of the present invention, the predetermined wavelength $\lambda$ of light in the substrate is 0.24 µm.

The method for producing a liquid crystal display device of this invention, comprises the steps of:

attaching a pair of substrates having electrodes to each other so that the electrodes on one of the substrates face the electrodes on the other of the substrates with a predetermined gap, thereby fabricating a cell in which the electrodes form a plurality of pixels arranged in a matrix;

injecting a mixture including liquid crystal and photocurable resin into the gap;

irradiating light having high intensity regions and low intensity regions to the mixture, thereby forming a liquid crystal layer including liquid crystal regions surrounded by polymer walls, wherein a parameter a represented by the following formula, using the minimum value d among distances between the low intensity regions and widths of the low intensity regions, a thickness z of the substrate on a side of the light irradiation, and a wavelength $\lambda$ of light in the substrate, is at least 1:

$$a=\{2/(\lambda \cdot z)\}^{1/2} \cdot d$$

In one embodiment of the present invention, the liquid crystal layer is formed by irradiating the light to the mixture using a photomask having light-shielding portions and light-transmitting portions, and the wavelength $\lambda$ of light in the substrate is 0.24 µm.

Thus, the invention described herein makes possible the advantage of providing a liquid crystal display device excellent in contrast characteristic and a method for producing the same.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings.

EXAMPLE 1

Figure 1:
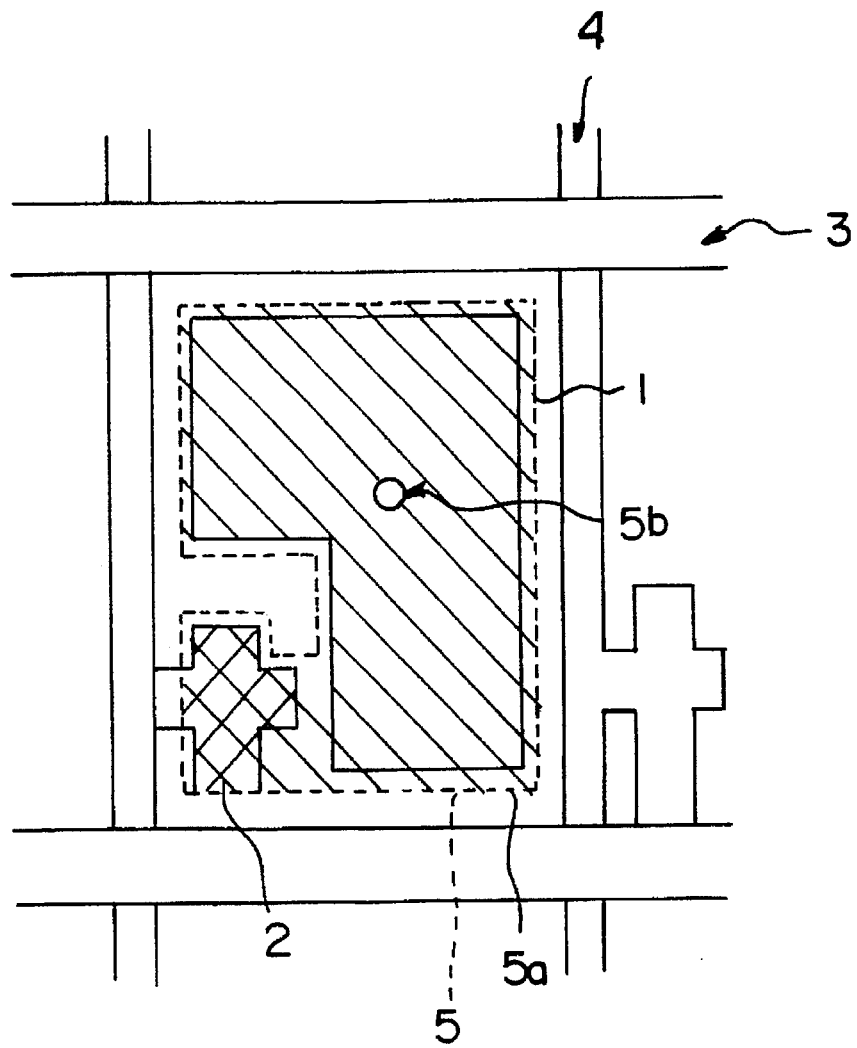
FIG. 1 is a view showing a part of a liquid crystal display device produced in Example 1 together with a photomask used.

First, as a counter electrode, transparent indium-tin oxide (ITO) was formed to a thickness of 500 Å on one glass substrate having a thickness of 1.1 mm, thereby obtaining a counter substrate for a 4"-display. Separately, as shown in FIG. 1, a source bus line 3 (signal line), a gate bus line 4 (scanning line), a pixel electrode 1, and a thin film transistor (TFT) 2 functioning as an active element connected to the source bus line 3, the gate bus line 4, and the pixel electrode 1 were formed on another glass substrate having a predetermined thickness, thereby obtaining a TFT substrate for a 4"-display. A counter substrate and a TFT substrate previously fabricated for a 4"-display can also be used.

The counter substrate and the TFT substrate were attached to each other without forming an alignment film. Spacers having a diameter of 5.5 μm were interposed between the attached counter substrate and the TFT substrate so as to keep a predetermined cell thickness. In this case, since a light-shielding layer such as a black mask is not present in the cell, a pixel is defined by the pixel electrode 1.

As shown in FIG. 1, a photomask 5 was placed on the counter substrate side so as to cover the pixel electrode 1 and the TFT 2. The photomask 5 has a hole 5b in the vicinity of the center of its light-shielding portion 5a represented by a hatched region. Any materials including metals such as molybdenum and aluminum, capable of shielding UV rays are suitable for the photomask 5. The same materials can be applied to the respective other examples.

Next, 0.1 g of R-684 (produced by Nippon Kayaku Co., Ltd.), 0.05 g of styrene, 0.75 g of isobornyl methacrylate, 0.10 g of perfluorooctyl methacrylate, 4 g of liquid crystal material ZLI-4792 with 0.3% chiral dopant S-811 (produced by Merck & Co., Inc.) added, and 0.0025 g of photo-initiator Irugacure 651 (produced by CIBA-GEIGY Corporation) were mixed. The mixture thus obtained was injected into the cell in a vacuum at 402 C.

The resultant cell was set under a high-pressure mercury lamp emitting parallel UV-rays at 10 mW/cm$^2$. Under the condition that the mixture was kept at 40° C., the UV-rays were irradiated from the counter substrate side to the cell through the photomask 5. The irradiation was conducted in 20 cycles, each cycle including one second irradiation and 30 seconds non-irradiation. After 20 cycles, the UV-rays were continuously irradiated to the cell for 10 minutes. The photomask 5 was removed and the UV-rays were continuously irradiated for another 10 minutes, thereby curing resin in the mixture. As a result, a liquid crystal layer in which liquid crystal regions were surrounded by polymer walls were formed in the cell. Each liquid crystal region included radially arranged liquid crystal domains.

Two polarizers were attached to both sides of the cell thus fabricated so as to be perpendicular to each other. Thus, a liquid display device was produced.

Figure 2A:
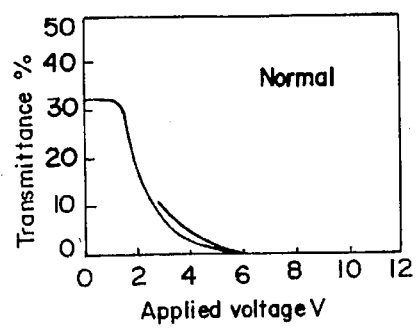
FIGS. 2(a) through 2(e) show electro-optical characteristics of the liquid crystal display device produced in Example 1.
Figure 2B:
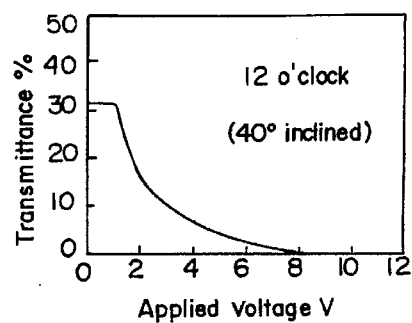
Figure 2C:
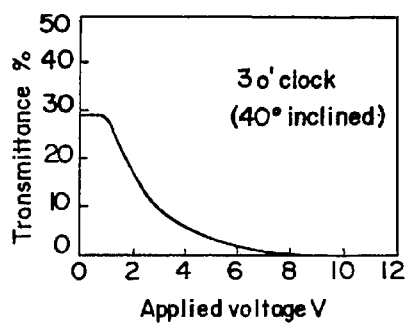
Figure 2D:
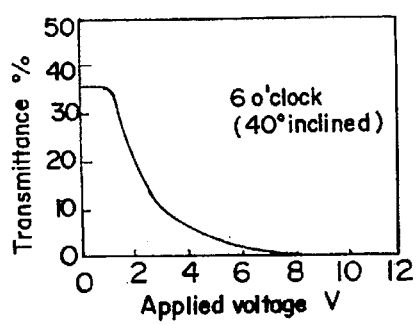
Figure 2E:
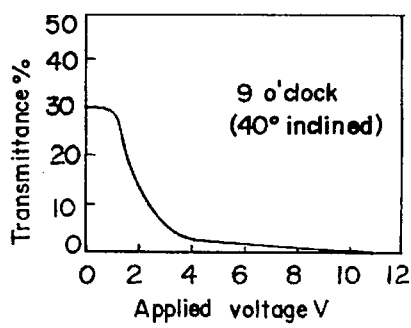
Figure 2F:
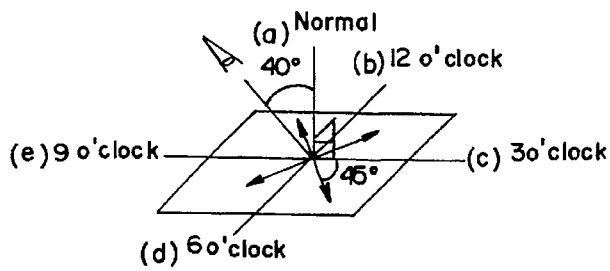
FIG. 2(f) shows directions in which the electro-optical characteristics are measured.

FIGS. 2(a) through 2(e) show electro-optical characteristics of the device, i.e., the change in transmittance (represented by a vertical axis) with respect to the applied voltage (represented by a horizontal axis). FIG. 2(f) shows the respective directions in which the electro-optical characteristics are measured. FIG. 2(a) shows an electro-optical characteristic measured in a vertical direction a of the cell; FIG. 2(b) shows an electro-optical characteristic measured in a direction which is inclined at 40° toward a direction b from the direction a, and the direction b has an angle of 45° with respect to a polarizing axis of the upper polarizer; FIG. 2(c) shows an electro-optical characteristic measured in a direction which is inclined at 40° toward a direction c from the direction a, and the direction c has an angle of 45° with respect to the polarizing axis of the upper polarizer; FIG. 2(d) shows an electro-optical characteristic measured in a direction which is inclined at 40° toward a direction d from the direction a, and the direction d has an angle of 45° with respect to the polarizing axis of the upper polarizer; and FIG. 2(e) shows an electro-optical characteristic measured in a direction which is inclined at 40° toward a direction e from the direction a, and the direction e has an angle of 45° with respect to the polarizing axis of the upper polarizer. The directions b, c, d, and e are shifted by 90° from each other.

As is understood from FIGS. 2(a) through 2(e), compared with the conventional TN liquid crystal display device, the liquid crystal display device of the present invention has improved viewing angle characteristics in which a white-black inversion phenomenon is not caused and the applied voltage-transmittance curve is hardly changed.

COMPARATIVE EXAMPLE 1

As a comparative example, a liquid crystal display device was produced.

First, the same mixture as that used in Example 1 was injected in a vacuum into an identical TFT cell with that of Example 1.

Figure 3:
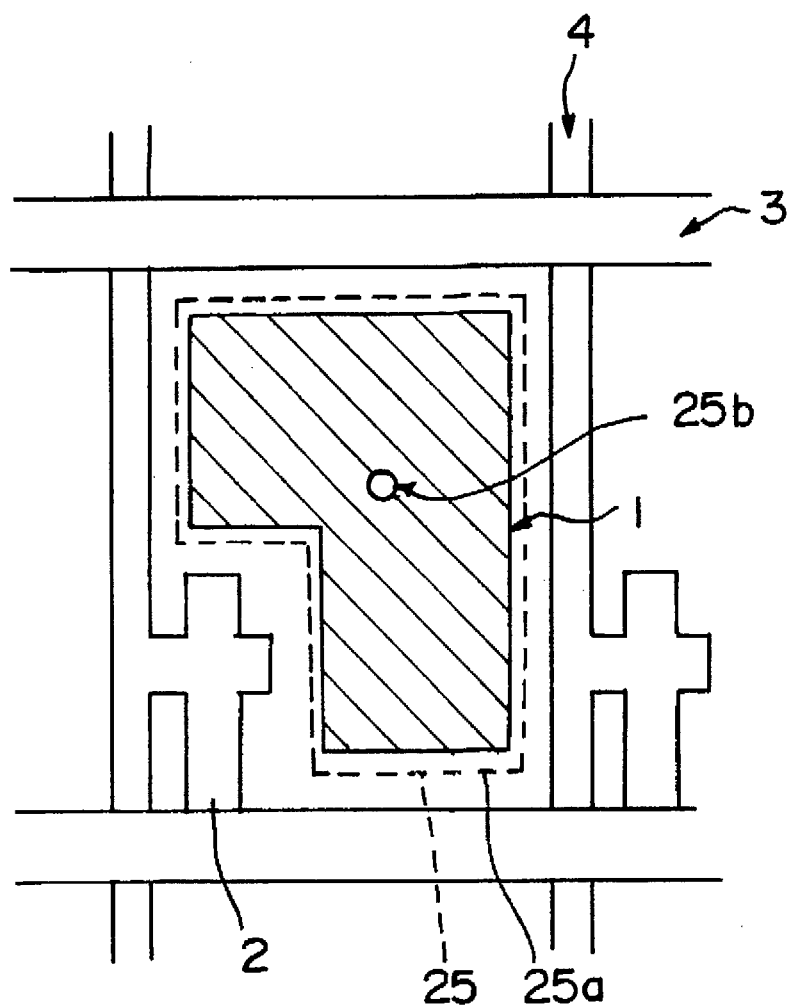
FIG. 3 is a view showing a part of a liquid crystal display device produced in Comparative Example 1 together with a photomask used.

As shown in FIG. 3, a photomask 25 was placed on the counter substrate side so as to cover only the pixel electrode 1. The photomask 25 has a hole 25b in the vicinity of the center of its light-shielding portion 25a represented by a hatched region. The UV-rays were irradiated to the cell in the same way as in Example 1. In this case, the TFT 2 was also irradiated with the UV-rays.

Two polarizers were attached to both sides of the cell thus fabricated so that the polarizing directions of the polarizers are perpendicular to each other. Thus, a liquid crystal display device was produced.

Figure 4:
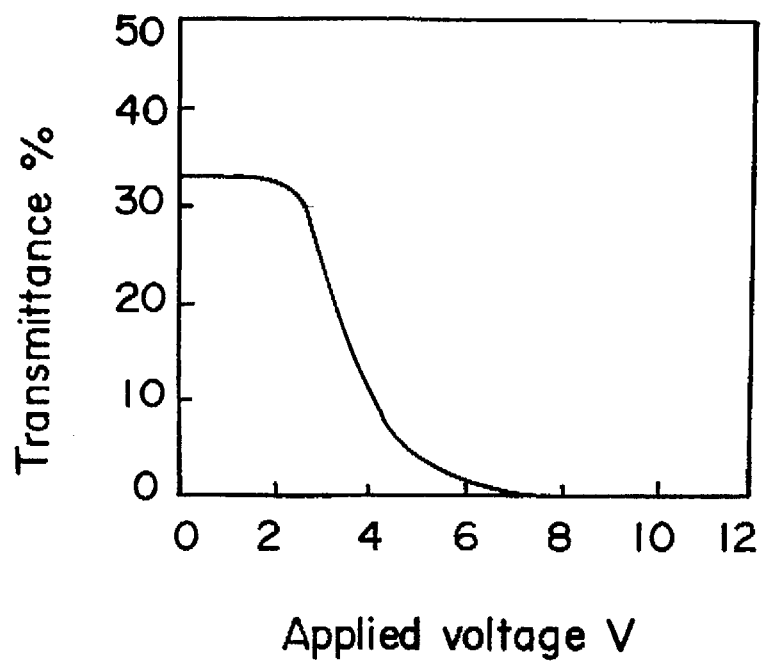
FIG. 4 shows an electro-optical characteristic of the liquid crystal display device produced in Comparative Example 1.

FIG. 4 shows an electro-optical characteristic measured in a vertical direction of the cell, i.e., the change in transmittance (represented by a vertical axis) with respect to the applied voltage (represented by a horizontal axis). As is understood from this figure, the applied voltage-transmittance characteristic curve is shifted by about 1 V toward a higher voltage side, compared with the curve in Example 1. The observation of the cell by a polarizing microscope revealed that the phase separation was almost the same as that of Example 1. Thus, it is assumed that the TFT is deteriorated upon the irradiation of UV-rays to cause this shift.

COMPARATIVE EXAMPLE 2

As another comparative example, a liquid crystal display device was fabricated.

First, polyimide was respectively spin-coated onto substrates as alignment films. The resultant substrates were cured. The alignment films were rubbed with a nylon cloth in the same direction. These substrates were attached to each other so that the rubbing directions perpendicularly cross each other and the cell thickness was 5.5 µm.

Then, liquid crystal material ZLI-4792 with 0.3% chiral dopant S-811 (produced by Merck & Co., Inc.) was injected into the cell thus obtained. Polarizers were attached to both sides of the cell so that the polarizing directions of the polarizers were perpendicular to each other. Thus, a TN liquid crystal display device was produced.

Figure 5A:
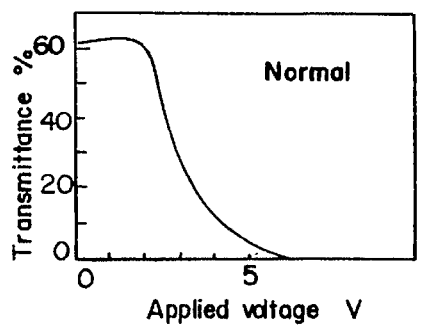
FIGS. 5(a) through 5(e) show electro-optical characteristics of the liquid crystal display device produced in Comparative Example 2.
Figure 5B:
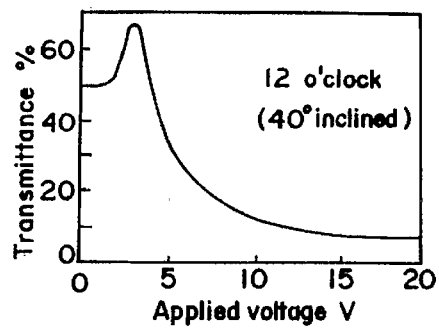
Figure 5C:
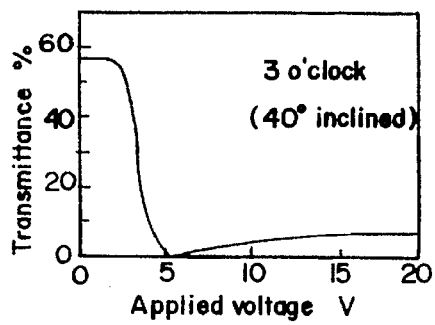
Figure 5D:
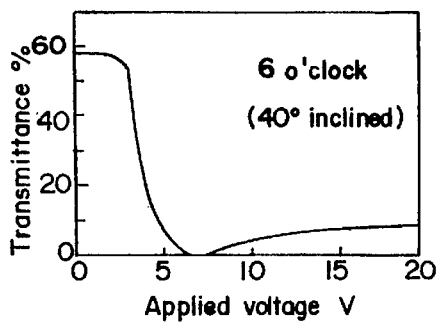
Figure 5E:
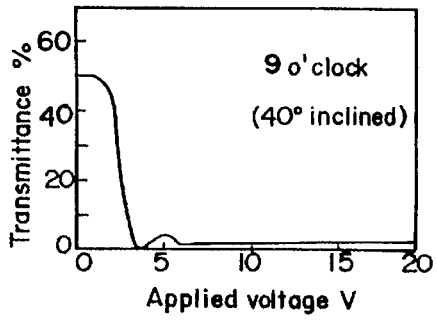
Figure 5F:
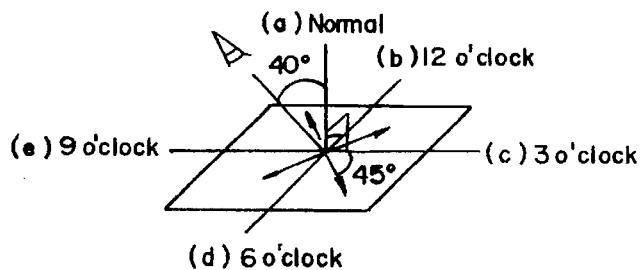
FIG. 5(f) shows directions in which the electro-optical characteristics are measured.

FIGS. 5(a) through 5(e) show electro-optical characteristics of the device, i.e., the change in transmittance (represented by a vertical axis) with respect to the applied voltage (represented by a horizontal axis). FIG. 5(f) shows the respective directions in which the electro-optical characteristics are measured. As is apparent from these figures, the liquid crystal display device of Comparative Example 2 has poor viewing characteristics such as the inversion phenomenon, the increase in transmittance due to saturation voltage, and the like.

EXAMPLE 2

A liquid crystal display device using a light-shielding layer will be described. The light-shielding layer is formed in a cell so as to cover a TFT portion; the TFT portion is prevented from being irradiated with UV-rays.

Figure 6:
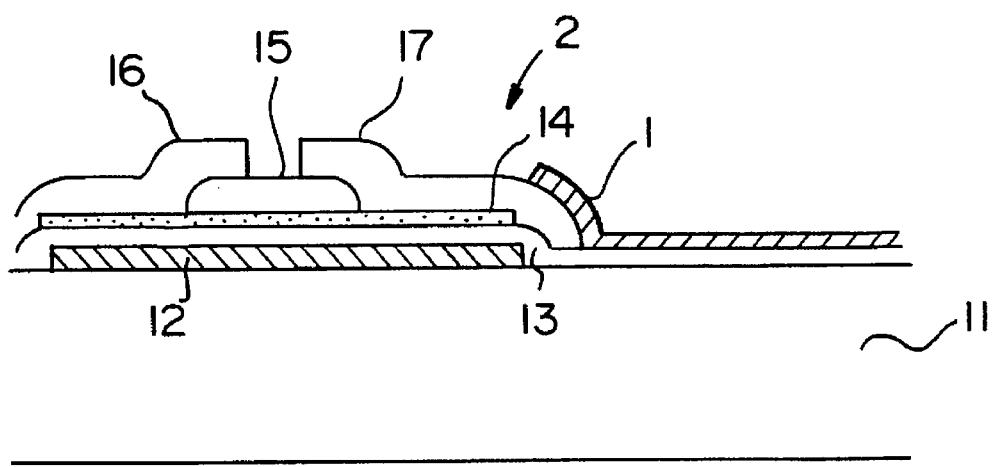
FIG. 6 is a cross-sectional view showing a TFT portion of a liquid crystal display device produced in Example 2.

First, as shown in FIG. 6, a Ta film partially working as a gate electrode 12 was provided to a thickness of 3000 Å on a glass substrate 11. An insulating film 13 made of $Ta_2O_5$ was formed to an thickness of 4000 Å over the Ta film. On the insulating film 13, an amorphous silicon layer 14 was formed. It is intended that the Ta film constitutes the gate electrode 12 and a gate bus line.

Then, an insulating film 15, for example, made of $Ta_2O_5$ was formed on the amorphous silicon layer 14. A source electrode 16 and a drain electrode 17 were formed so as to partially cover the insulating film 15. The source electrode 16, the drain electrode 17, and the gate electrode 12 constitutes a TFT 2. A pixel electrode 1 was formed so as to partially overlap the drain electrode 17, thereby obtaining a TFT substrate.

The TFT substrate thus obtained an a previously produced counter substrate having a counter electrode were attached to each other. On the counter substrate, a black mask had previously been positioned so as to cover the portions of the TFT substrate other than the pixel electrodes when the TFT substrate and the counter substrate are attached to each other.

Next, the same mixture as that used in Example 1 was injected in a vacuum between the substrates. The photomask 25 shown in FIG. 3 was attached to the TFT substrate side of the cell so as to cover the pixel electrode 1. UV-rays were irradiated to the cell from the TFT substrate side in the same way as in Example 1. The irradiation conditions were the same as those in Example 1. In this case, the gate electrode 12 and the insulating film 13 work as a light-shielding layer for preventing the portion of the TFT 2 from being irradiated with the UV-rays. As a material for the insulating film 13, transparent inorganic substances such as $Ta_2O_5$, $SiO_x$, and $SiN_x$ are preferably used. The shape of the insulting film 13 for covering the portion of the TFT 2 is not particularly limited; It is preferred that the insulating film 13 has the minimum possible size while sufficiently covering the portion of the TFT 2.

Figure 7:
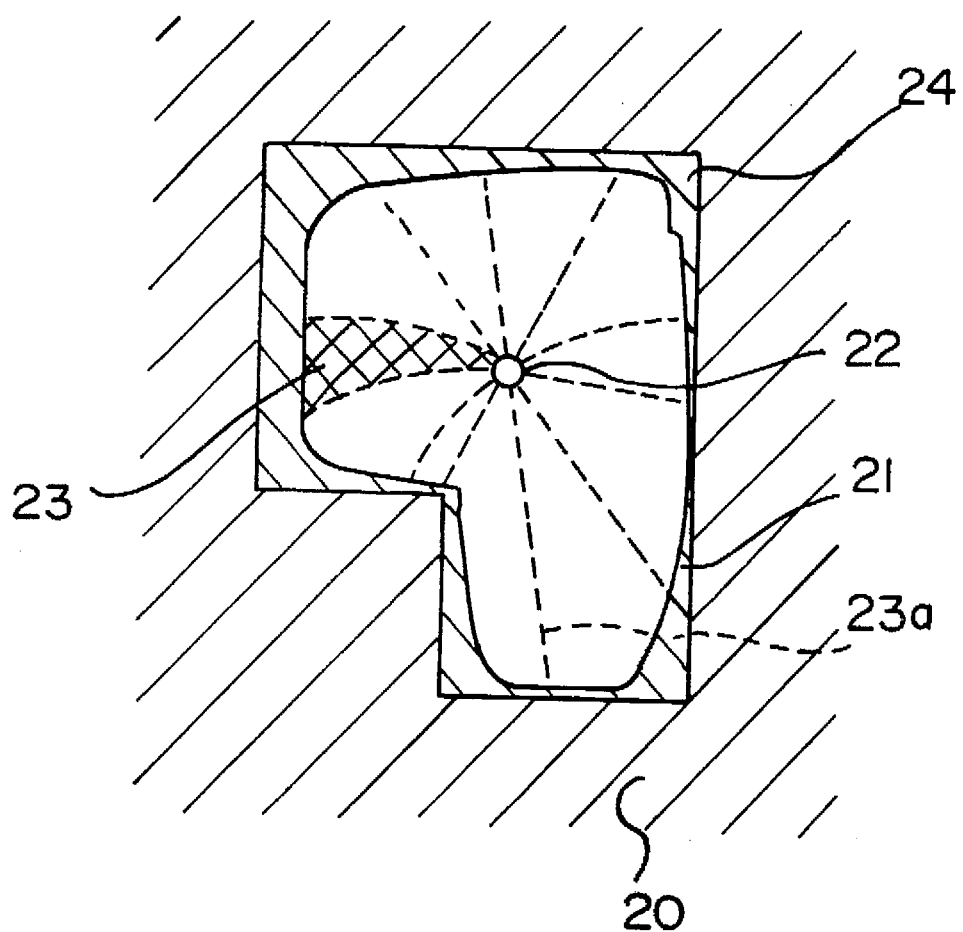
FIG. 7 is a schematic view showing one pixel portion of the liquid crystal display device produced in Example 2.

FIG. 7 is a schematic view showing the result of the observation by a polarizing microscope of the liquid crystal display device thus produced. As is understood from this figure, in the same way as in Example 1, a liquid crystal layer formed in the cell has a structure in which a liquid crystal region 21 is formed in each pixel, and each liquid crystal region 21 has liquid crystal domains 23 radially arranged around a polymer island 22 positioned at the center of the liquid crystal region 21. In this figure, the reference numeral 20 denotes a light-transmitting portion of the black mask, 23a a disclination line, and 24 a polymer wall.

The liquid crystal display device thus produced has excellent viewing angle characteristics similar to those of Example 1. More specifically, a contrast inversion phenomenon and change in contrast depending upon the viewing angle are hardly caused.

EXAMPLE 3

The present example shows the case where a liquid crystal layer is formed by irradiating UV-rays from the counter substrate side, using a cell in which the counter substrate having a black mask faces a TFT substrate.

Figure 8:
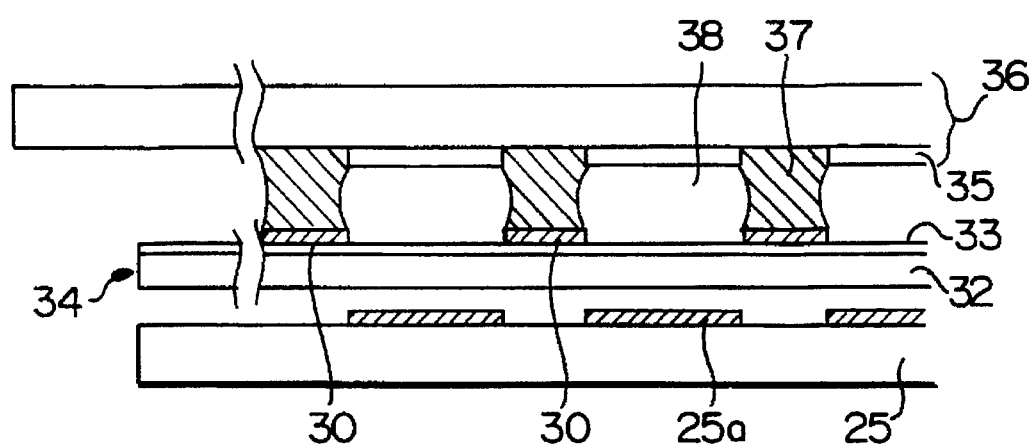
FIG. 8 is a cross-sectional view of a liquid crystal display device produced in Example 3.
Figure 9:
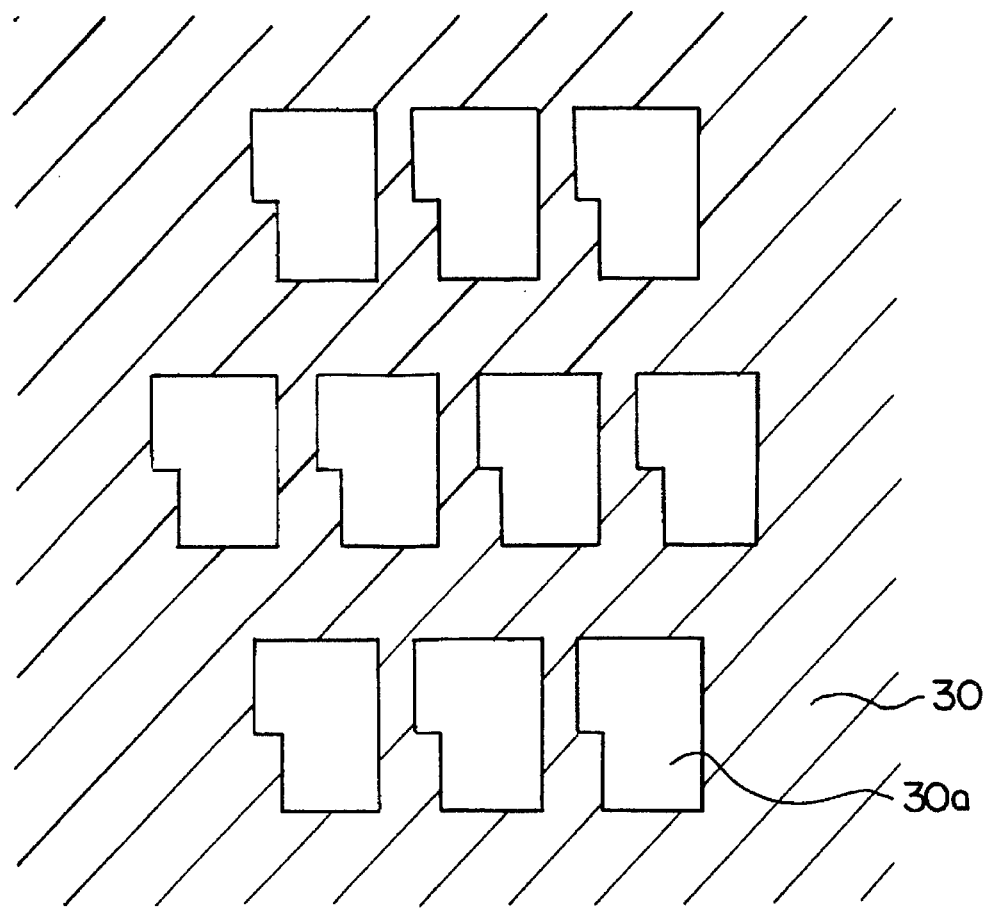
FIG. 9 is a plan view of a black mask provided on the liquid crystal display device produced in Example 3.

First, as shown in FIG. 8, a black mask 30 and a counter electrode 33 made of transparent ITO having a thickness of 500 Å was formed on a glass substrate 32 having a thickness of 1.1 mm, thereby obtaining a counter substrate 23 for a 4"-display. As shown in FIG. 9, the black mask 30 has light-transmitting portions 30a corresponding to pixels. Separately, a TFT substrate 36 for a 4"-display having pixel electrodes 35 and the like was fabricated in the same way as in Example 1.

Figure 10:
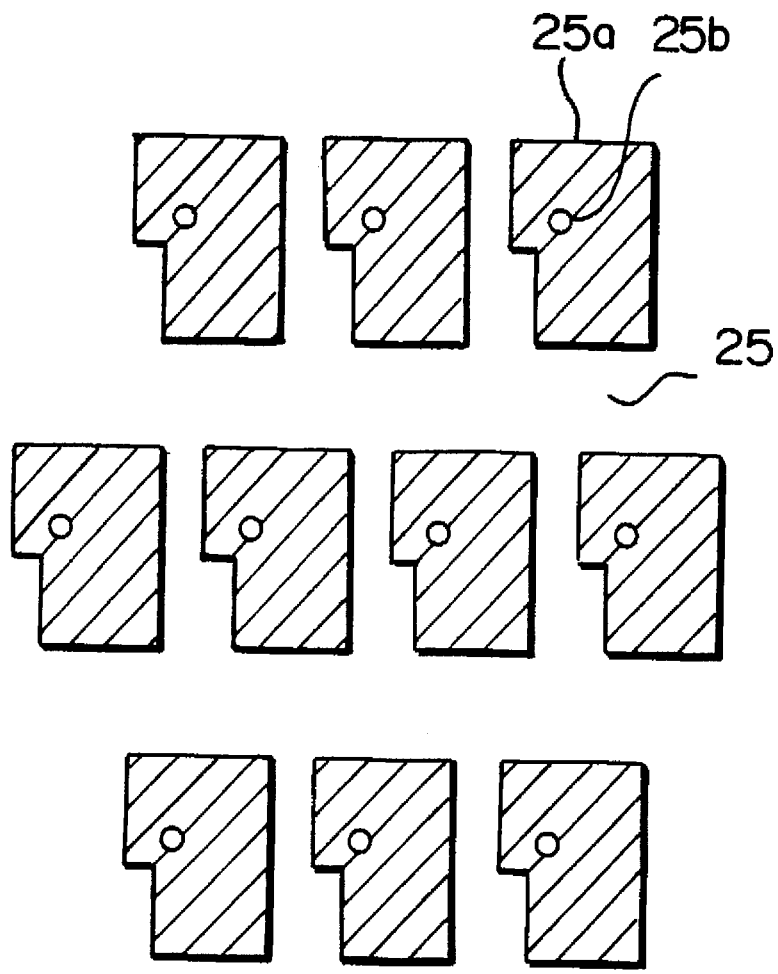
FIG. 10 is a plan view showing an example of a photomask used in Example 3.

The two substrates 34 and 36 were attached to each other without forming an alignment film so that the respective glass substrate sides were outside. Then, spacers (not shown) having a particle size of 5.5 µm were interposed between the substrates 34, 36 so as to keep a uniform cell thickness. Thus, a cell was fabricated. A photomask 25 having a hole 25b in the vicinity of the center of each light-shielding portion 25a for covering each pixel electrode 35 (see FIG. 10) was positioned on the counter substrate side of the cell thus fabricated. The photomask 25 was fixed to the cell with a UV-ray curable resin.

Next, 0.1 g of R-684 (produced by Nippon Kayaku Co., Ltd.), 0.05 g of styrene, 0.75 g of isobornyl methacrylate, 0.10 g of perfluorooctyl methacrylate, 4 g of liquid crystal material ZLI-4792 with 0.3% chiral dopant S-811 (produced by Merck & Co., Inc.) added, and 0.0025 g of photo-initiator Irugacure 651 (produced by CIBA-GEIGY Corporation) were mixed. The mixture thus obtained was injected into the cell in a vacuum at 40° C.

The resultant cell was set under a high-pressure mercury lamp emitting parallel UV-rays at 10 mW/cm². Under the condition that the mixture was kept at 40° C., the UV-rays were irradiated from the counter substrate side to the cell through the photomask 25 as shown in FIG. 8. The irradiation was conducted in 20 cycles, each cycle including one second irradiation and 30 seconds non-irradiation. After 20 cycles, the UV-rays were continuously irradiated to the cell for 10 minutes. The photomask 25 was removed and the UV-rays were continuously irradiated for another 10 minutes. At this time, if each light-transmitting portion of the black mask 30 is formed in the same size as that of each light-shielding portion of the photomask 25 covering the pixel electrodes 35, light is not likely to come into the cell, making it impossible to form a desired liquid crystal layer. For this reason, in the present example, the light-shielding portion of the black mask 30 is set to occupy 70% or less of an entire area of the portions other than the pixel electrodes 35 (i.e., portions which are not covered with the photomask 25).

As a result of the irradiation, resin in the mixture was cured, whereby liquid crystal regions 38 partitioned by polymer walls were formed in the cell. Each liquid crystal region 38 included radially arranged liquid crystal domains. It is noted that the hole 25b of the light-shielding portion 25a is for making the liquid crystal domains radially arranged. Two polarizers were attached to both sides of the cell so that the polarizing directions of the polarizers are perpendicular to each other. Thus, a liquid crystal display device was produced.

The liquid crystal display device thus produced has excellent viewing angle characteristics. More specifically, a contrast inversion phenomenon and change in contrast depending upon the viewing angle are hardly caused. Furthermore, the observation of the cell by a polarizing microscope revealed that liquid crystal was aggregated in the pixel regions.

As described above, in the present example, the light-shielding portion of the black mask 30 is set to occupy 70% or less of an entire area of the portions other than the pixel electrodes 35 (i.e., portions which are not covered with the photomask 25). The reason for this is as follows: When the light-shielding portion of the black mask 30 occupies more than 70% of the entire area of the portions other than the pixel electrodes 35, regions to be irradiated are not sufficient and polymer walls are not clearly formed in desired portions. As a result, the polymer walls come in the pixels, leading to the decrease in contrast.

Figure 11:
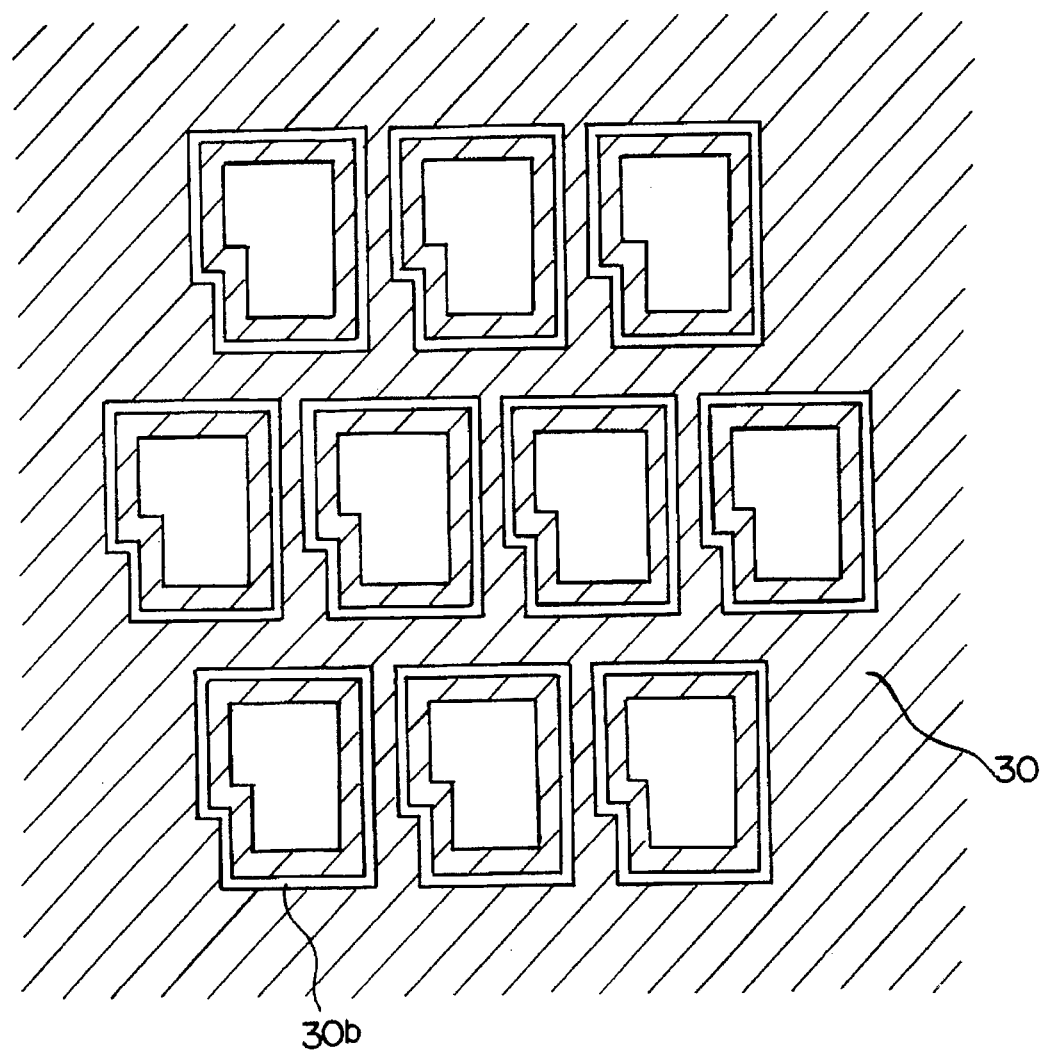
FIG. 11 is a plan view showing another example of a photomask used in Example 3.

For making the light-shielding portion of the black mask 30 occupy 70% or less of the entire area of the portions other than the pixel electrodes 35, the following can be conducted: The inner periphery of the light-transmitting portion of the black mask 30 is set to be larger than the outer periphery of the light-shielding portion of the photomask 26; the light-shielding portion of the black mask 30 is partially opened to form light-transmitting portions 30b as shown in FIG. 11; or both of these methods are used.

COMPARATIVE EXAMPLE 3

As another comparative example, a liquid crystal display device was produced as follows.

Figure 12:
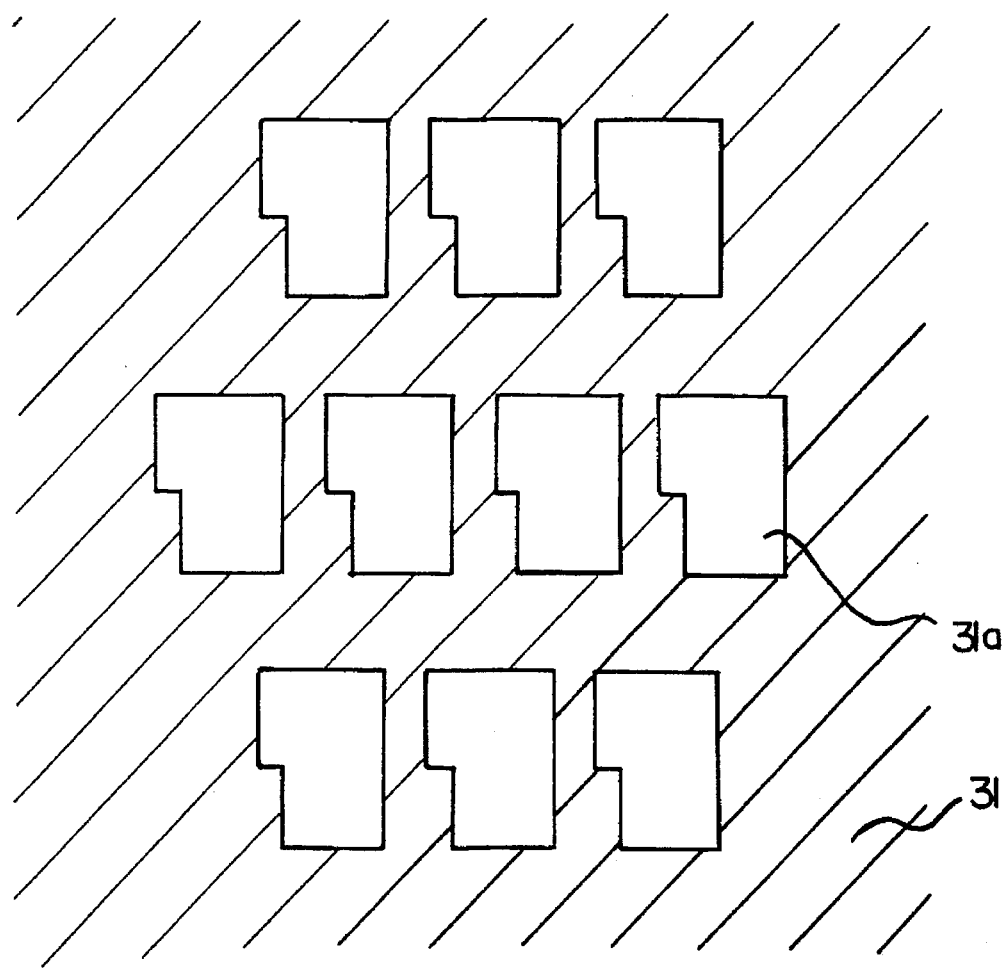
FIG. 12 is a plan view of a photomask used in Comparative Example 3.

First, the same TFT substrate as that used in Example 3 and a counter substrate provided with a black mask 31 having a light-transmitting portions 31a corresponding to pixel electrodes as shown in FIG. 12 were attached to each other to obtain a cell in the same way as in Example 3. If the light-transmitting portions 31a are formed so as to be smaller than the pixel electrodes, the size of pixels will be defined by the light-transmitting portions 31a.

A photomask was attached to the TFT substrate side of the cell thus produced. The same material for a liquid crystal layer as that of Example 3 was injected into the cell. UV-rays were irradiated to the cell from the TFT substrate side. The irradiation conditions were the same as those in Example 3.

Figure 13:
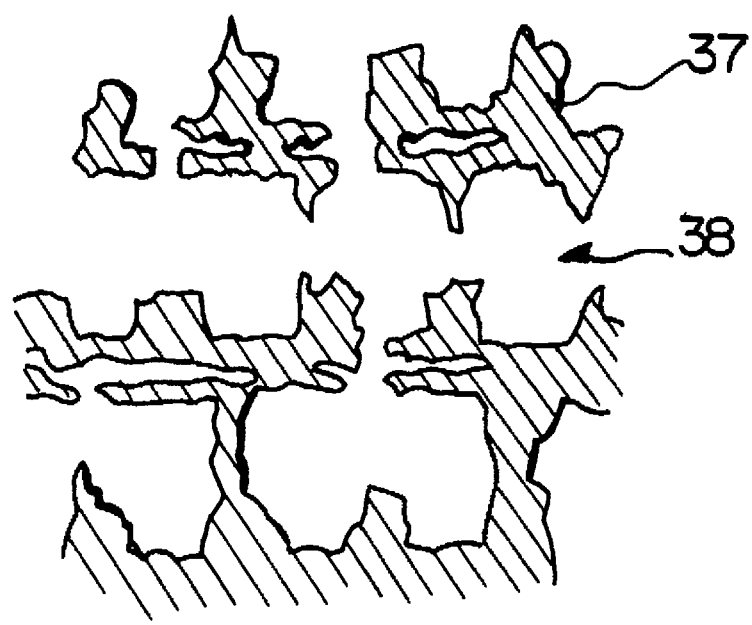
FIG. 13 is a plan view showing a state in which liquid crystal regions and polymer walls are formed in a liquid crystal display device produced in Comparative Example 3.

The cell was separated into the TFT substrate and the counter substrate in liquid nitrogen. The liquid crystal material was washed with acetone and the polymer material was observed by a scanning electron microscope (SEM). FIG. 13 shows the results of the observation. As shown in FIG. 13, liquid crystal regions 38 were formed even in portions of the liquid crystal layer corresponding to gate bus lines and polymer walls 37 came in the pixel portions. Since the UV-rays transmittance of the gate bus lines is low, the photocurable polymer was not sufficiently cured in portions at which UV-rays were shielded by the gate bus lines.

Table 1 shows transmittance under no voltage application of the liquid crystal display devices of Example 3 and Comparative Example 3, in both of which two polarizers are attached to both sides of the cell so that the polarizing directions of the polarizers are perpendicular to each other. In this case, the transmittance of the black mask used for the liquid crystal display device and the two polarizers which are attached so that the polarizing directions of the polarizers are parallel with each other, is set to be 100%.

TABLE 1

|                        | Example 3 | Comparative Example 3 |
|------------------------|-----------|----------------------|
| Light transmittance (%) | 38        | 22                   |

As is understood from the above table, the transmittance of Example 3 under no voltage application was sufficiently higher than that of Comparative Example 3.

There is the following advantage for irradiating light to the cell from the counter substrate side as in Example 3. Until recently, as in Comparative Example 3, light has been irradiated to the cell from the TFT substrate side under the condition that the photomask is placed on the TFT substrate side. However, in this case, gate bus lines and source bus lines made of light-shielding material are formed on the TFT substrate, so that liquid crystal regions are formed in portions corresponding to the gate bus lines and the source bus lines and polymer walls come in the pixel portions. Irradiation from the counter substrate side can prevent such a problem.

EXAMPLE 4

In the present example, the case where a photomask and a cell are easily aligned with each other will be described.

Figure 14:
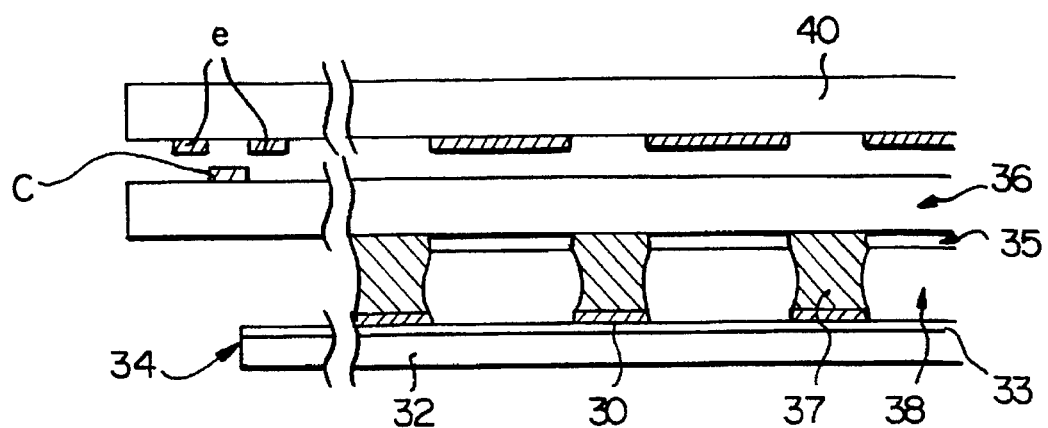
FIG. 14 is a cross-sectional view of a liquid crystal display device produced in Example 4.
Figure 15A:
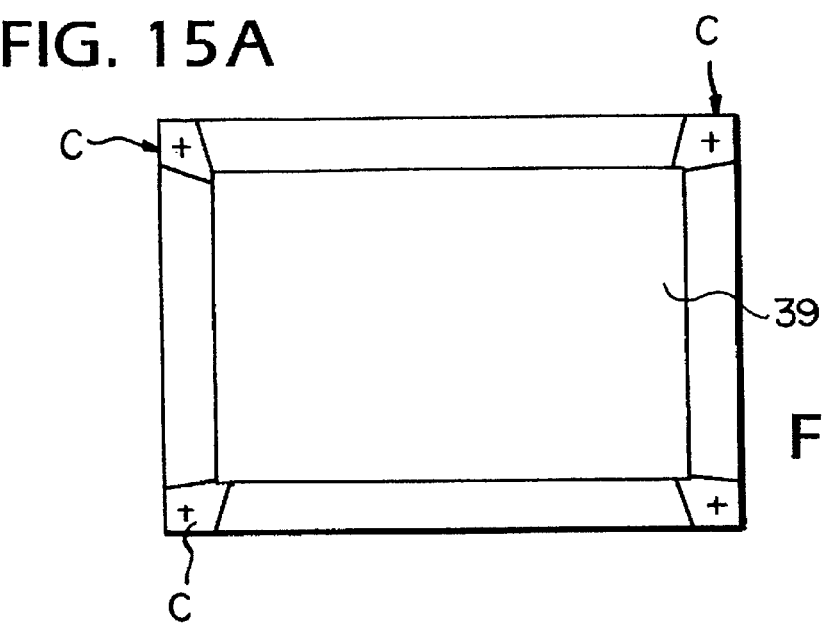
FIG. 15(a) shows the positions of markers on a substrate of the liquid crystal display device produced in Example 4.
Figure 15B:
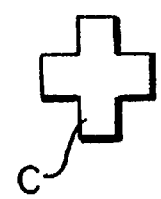
FIG. 15(b) is a detailed view of the marker.

As shown in FIG. 14, a black mask 30 for allowing light to radiate to only pixel portions and a counter electrode 33 made of ITO having a thickness of 500 Å were formed on a glass substrate 32 having a thickness of 1.1 mm. In this way, a counter substrate 34 for a 4"-display was fabricated. Separately, a TFT substrate 36 for a 4"-display was fabricated. The TFT substrate includes a display region 39 on which a plurality of pixel electrodes are formed, makers c in a plus shape being provided at each corner, as shown in FIGS. 14 and 15(a). FIG. 15(b) shows the detailed maker c.

The substrates 34 and 36 were attached to each other without forming an alignment film so that the respective glass substrates were outside. Spacers having a diameter of 5.5 μm (not shown) were interposed between the substrates 34 and 36 so as to keep a predetermined cell thickness.

Figure 16A:
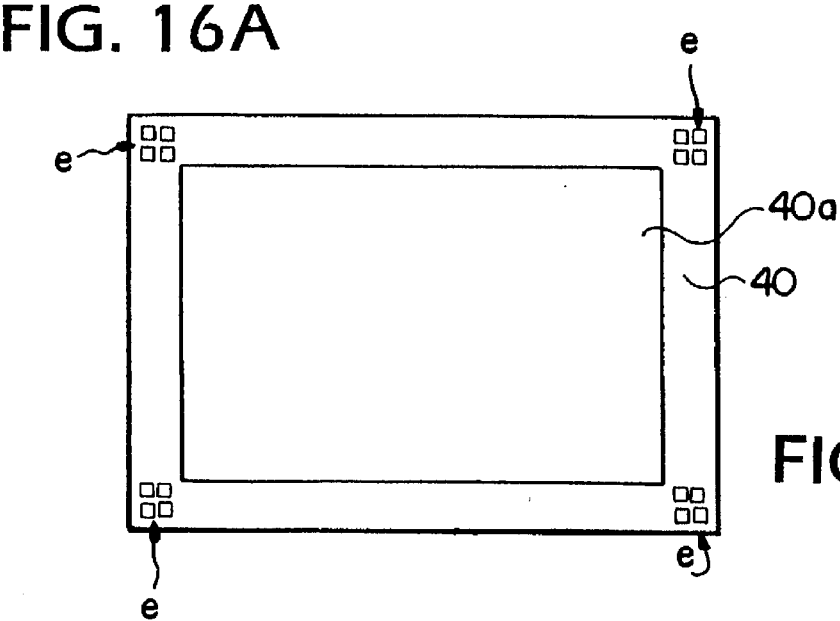
FIG. 16(a) shows positions of markers on a photomask used for producing the liquid crystal display device of Example 4.
Figure 16B:
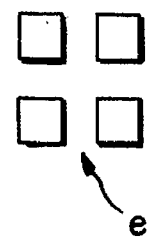
FIG. 16(b) is a detailed view of the marker.
Figure 16C:
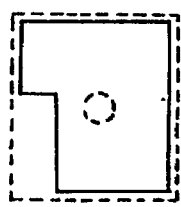
FIG. 16(c) shows the positional relationship between a pixel region and a light-shielding portion of the photomask.

Next, a photomask 40 was attached to the TFT substrate 36. The photomask 40 has markers e at each corner outside of a photomask region 40a as shown in FIGS. 14 and 16(a). The marker 3 has a shape obtained by removing the plus mark of the marker c from a square. In this case, the square is made of the combination of the marker c and the marker e. The shape which is obtained by the combination of the markers formed on the photomask 40 and the substrate of the cell is not limited to a square. The shape can be a rectangle, a triangle, a circle, etc. The photomask 40 was attached to the TFT substrate 36 while observing the markers c and e by a microscope. The substrate 36 and the photomask 40 were fixed to each other with UV-ray curable resin. When the markers c of the cell and the markers e of the photomask 40 are overlapped with each other, light leakage is not likely to occur due to no gaps between the markers c and e; thus, the photomask and the cell can be accurately aligned with each other. FIG. 16(b) shows the detailed marker e; FIG. 16(c) shows the positional relationship between the light-shielding portion of the photomask 40 (represented by a broken line) and the light-transmitting portion of the black mask 30, i.e., the pixel region (represented by a solid line).

Next, 0.1 g of R-84 (produced by Nippon Kayaku Co., Ltd.), 0.05 g of styrene, 0.75 g of isobornyl methacrylate, 0.10 g of perfluorooctyl methacrylate, 4 g of liquid crystal material ZLI-4792 with 0.3% chiral dopant S-811 (produced by Merck & Co., Inc.) added, and 0.0025 g of photo-initiator Irugacure 651 (produced by CIBA-GEIGY Corporation) were mixed. The mixture thus obtained was injected into the cell in a vacuum at 40° C.

The resultant cell was set under a high-pressure mercury lamp emitting parallel UV-rays at 10 mW/cm$^2$. Under the condition that the mixture was kept at 40° C., the UV-rays were irradiated to the cell from the TFT substrate side through the photomask 40. The irradiation was conducted in 20 cycles, each cycle including one second irradiation and 30 second non-irradiation. After 20 cycles, the UV-rays were continuously irradiated to the cell for 10 minutes. The photomask 40 was removed and the UV-rays were continuously irradiated for another 10 minutes, thereby curing the resin in the mixture. As a result, a liquid crystal layer in which liquid crystal regions were surrounded by polymer walls were formed in the cell. Each liquid crystal region included radially arranged liquid crystal domains.

Two polarizers were attached to both sides of the cell so that the polarizing directions of the polarizers are perpendicular to each other. Thus, a liquid crystal display device was produced.

In the liquid crystal display device thus produced, since the cell was accurately aligned with the photomask, liquid crystal regions and polymer walls were provided in desired positions. In addition, the liquid crystal display device thus produced has excellent viewing angle characteristics. More specifically, a contrast inversion phenomenon and change in contrast depending upon the viewing angle are hardly caused. Furthermore, the observation of the cell by a polarizing microscope revealed that liquid crystal was aggregated in the pixel regions.

COMPARATIVE EXAMPLE 4

A cell was fabricated using a TFT substrate without marks (which is the same as that of Example 4 except that markers are not present). Attaching the photomask to the TFT substrate of the cell by using a microscope was tried. However, since the TFT substrate has a thickness of 1.1 μm, it was not possible to observe the patterns of the photomask and the TFT substrate at the same time, making it very difficult to attach the photomask to the TFT substrate.

In Example 4, the markers are used for the alignment of the photomask with the cell. The position of the markers are set as follows:

Markers can be positioned in the display region 39 having TFTs and the like or in the outer peripheral portion of the display region 39 as shown in FIG. 15(a). Considering the degree of freedom of design, it is preferred to position the markers in the outer peripheral portion of the display region. Alternatively, the patterns of each pixel and TFT can be used as markers. The patterns inside of the cell can be formed on the external surface of the cell by a photolighograph technique and the pattern thus formed can be used for the alignment of the photomask and the substrate. These markers are respectively formed so as to correspond to markers provided on the photomask. Thus, the photomask is attached to the substrate so that the markers on the photomask are aligned with the markers on the substrate, whereby the light-shielding portions of the photomask can be appropriately positioned on the respective pixels.

Figure 17:
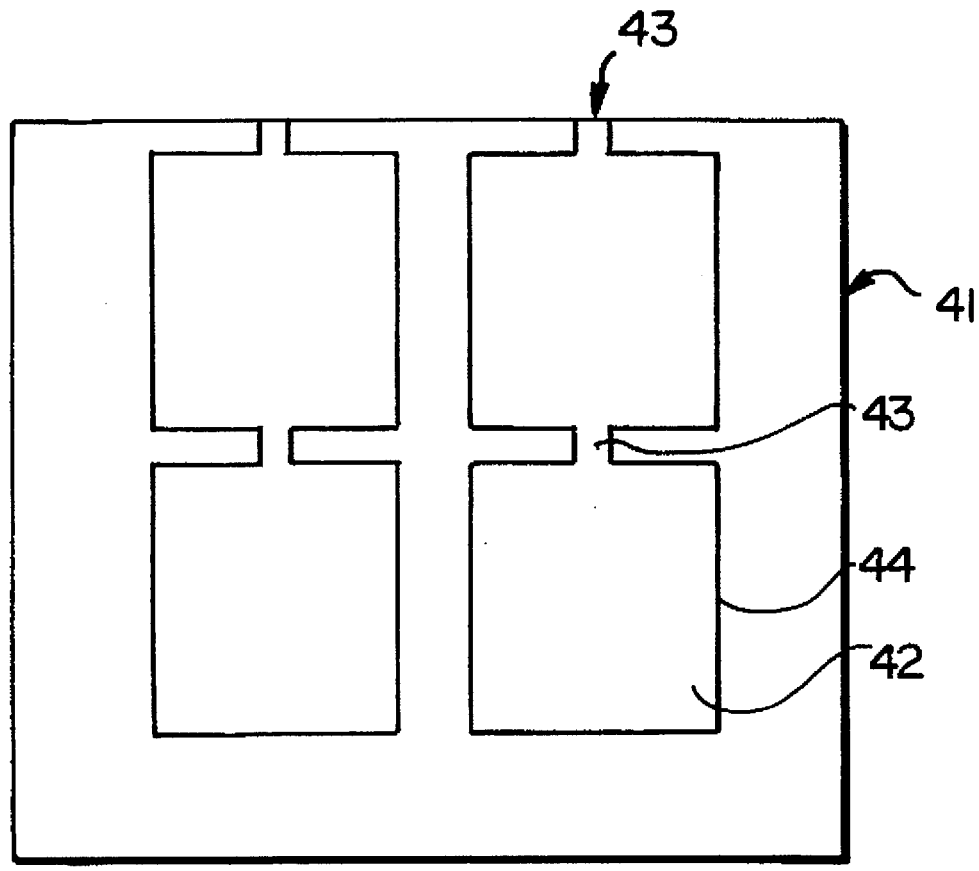
FIG. 17 is a plan view showing a sealing pattern used in the case where a plurality of cells are produced at one time.

Furthermore, the case where a plurality of cells 42 are fabricated from one substrate 41 will be described with reference to FIG. 17. As shown in FIG. 17, a sealing pattern 44 has a structure in which each cell 42 is connected to each other through injection ports 43 for injecting a mixture for a liquid crystal layer. A mixture containing a liquid crystal material, a photocurable resin, and a photo-initiator is injected into the cells 42 through the injection ports 43. Then, a photomask is attached to the cells 42 and under this condition, UV-rays are irradiated to the cells 42. In this way, a plurality of cells 42 can be fabricated.

Two or more markers need to be provided because the markers work for determining a planar position. It is preferred that respective adjacent markers are positioned apart from each other. As shown in FIG. 15(a), it is preferred that the markers are positioned at each corner of the outer peripheral portion of the display region 39. A plurality of markers can be preferably positioned between the respective corners.

In order to make it easy to recognize a marker, a material with high reflectivity such as aluminum, tantalum, and molybdenum can be used for the markers. Alternatively, resin with dye and pigment added can be used. The markers made of these materials may be removed with a solvent or an etchant after the fabrication of the cell, if required.

EXAMPLE 5

The present example shows the case where the alignment of the photomask with the cell is not required.

First, on a TFT substrate side of the cell which is the same as that of Comparative Example 4, a negative photoresist, e.g., OMR 84 (produced by Tokyo Ohka Co., Ltd.) with 10% carbon black added was coated by spin coating. UV-rays were irradiated to the photoresist from a counter substrate side, and a light-shielding layer was formed on the TFT substrate by developing the photoresist. The light-shielding layer had a pattern corresponding to a pattern of light-transmitting portions of the black mask. The black mask allows light to transmit only in pixel portions, so that the light-shielding layer is formed so as to cover only the pixel portions.

Next, the same liquid crystal material as that of Example 4 was injected into the cell, and UV-rays were irradiated into the cell from the TFT substrate side in the same way as in Example 4. At this time, as described above, the light-shielding layer was formed so as to cover only the pixel portions and functioned as the photomask in Example 4, so that polymer walls made of resin in the liquid crystal material were formed in the portions other than the pixel portions and liquid crystal regions surrounded by the polymer walls were formed in the pixel portions.

The light-shielding layer formed on the TFT substrate was removed with a release agent to fabricate a cell. The observation of the cell thus fabricated by a polarizing microscope revealed that the liquid crystal regions aggregate in the pixel portions and each liquid crystal region was made of a plurality of liquid crystal domains. When polarizers were attached to the cell so that the polarizing directions of the polarizers are perpendicular to each other, the viewing angle characteristics of the liquid crystal display device were excellent in the same way as in Example 4.

Examples of a material for the light-shielding layer used in the present invention include the following: In the case of the transparent liquid crystal display device, since the light-shielding layer must be removed after the fabrication of the cell, for example, after the irradiation of UV-rays, a material which can be easily removed with a solvent, e.g., an organic polymer compound containing a material absorbing UV-rays, such as dye, pigment, or carbon black, can be used.

In the case of the reflective light crystal display device, since the light-shielding layer is not required to be removed after the fabrication of the cell, a material which can be used as a reflective plate such as a metal thin film can be used.

The reasons for the accurate alignment of the photomask and the light-shielding layer with the cell in Examples 4 and 5 are as follows: The liquid crystal regions are formed in the pixel portions and the polymer walls are formed in the portions other than the pixel portions so that the polymer walls do not come in the pixel portions. In addition, UV-rays are not irradiated to the TFT portions.

In each of the above examples, TFTs are used as active elements. The present invention is not limited thereto. It is noted that other active elements, e.g., MIMs can be applied in the similar way.

The present invention is applied to the liquid crystal display device in which the liquid crystal domains constituting the liquid crystal regions are arranged in a radial or random manner and the liquid crystal regions are surrounded by the polymer walls. It is noted that the present invention can be applied to most active drive liquid crystal display devices, such as TN, STN, FLC, and ECB liquid crystal display devices.

As the liquid crystal material used in the present invention, the following can be used in addition to the material described above. More specifically, a mixture of organic compounds exhibiting a liquid crystal state in the vicinity of room temperature, such as nematic liquid crystal (including two-frequency drive liquid crystal, $\Delta \epsilon <0$), cholestric liquid crystal (in particular, liquid crystal having a selective reflection characteristic with respect to visible light), smectic liquid crystal, ferroelectric liquid crystal, and discotic liquid crystal can be used. These liquid crystals can be used alone or in combination. In particular, nematic liquid crystal, nematic liquid crystal with cholesteric liquid crystal (chiral dopant) added, and ferroelectric crystal are preferred because of their characteristics. Liquid crystal which is more stable against chemical reactions is more desirable. Namely, liquid crystal having a functional group such as a fluorine atom in its molecule is more preferred, since photopolymerization is involved during the processing of liquid crystal. Specific examples of such liquid crystal include ZLI-4801-000, ZLI-4801-001, and ZLI-4792 (produced by Merck & Co., Inc.).

As a material for the alignment film used in the present invention, organic films made of polyimide or the like, e.g., SE 150 (produced by Nissan Chemical Industries Ltd.) and organic film of another type, e.g., CYTOP (produced by Asahi Glass Co., Ltd.) or inorganic films made of SiO or the like can be used. The alignment film can be subjected to alignment treatment such as rubbing, if required. In the liquid crystal display device in which the liquid crystal domains are arranged in a random manner, a thin film having the same effect as that of the alignment film is automatically formed between the substrate and the liquid crystal regions during the production of the device, so that the alignment film can be omitted.

As described above, according to the present invention, UV-rays are irradiated to the cell under the condition that the active elements are covered with the photomask, light-shielding layer, or the like. Thus, the active elements are not irradiated with the UV-rays and can be prevented from deteriorating; The display characteristics such as the decrease in contrast can be prevented. Moreover, in the case where the markers are formed on the photomask and the substrate of the cell, the photomask and the substrate are aligned with each other; using the markers. In particular, the marker on one side (e.g., the substrate) is formed so as to have a shape obtained by removing the shape of the marker on the other side (e.g., the photomask) from a square, the photomask and the substrate are accurately aligned with each other. In this case, the square is made of the combination of the marker on one side and the marker on the other side. Furthermore, in the case where the light-shielding layer is formed outside of the cell, for example, using a negative photoresist, the light-shielding layer can be automatically aligned with the cell in an accurate manner, even though the light-shielding portions of the light-shielding layer are tried to be aligned with the cell. Consequently, a cured polymer is not formed in the liquid crystal regions; Thus, a liquid crystal display device excellent in contrast characteristics can be obtained.

EXAMPLES 6, 7 AND 8 AND COMPARATIVE EXAMPLE 5

The inventors of the present invention have extensively studied the relationship between the shape of a light-transmitting member having a plurality of light-shielding portions and a plurality of light-transmitting portions and the distance between the light transmitting member and the liquid crystal layer. As a result, the following was found.

When the distance between the respective light-shielding portions of the light-shielding member becomes smaller, the diffraction phenomenon of light used for irradiation cannot be ignored. When the distance between the respective light-shielding portions is small or each light-shielding portion has a small width, light reaches under the light-shielding portions because of the diffraction. Even if the light-shielding portions are formed so that a photocurable resin in a pixel portion is not irradiated with light, the diffraction allows light to reach the pixel portion.

The diffraction phenomenon of light can be prevented by defining the shape and size of the light-transmitting member or the shape and size of the pixels. By doing so, when the photocurable resin is locally cured form a homogeneous mixture of a liquid crystal material and a photocurable resin to phase-separate the mixture into liquid crystal and a polymer material, light is prevented from coming into the pixels. Thus, a cured polymer is not formed in the pixels, whereby a liquid crystal display device excellent in contrast characteristics can be obtained.

Figure 19:
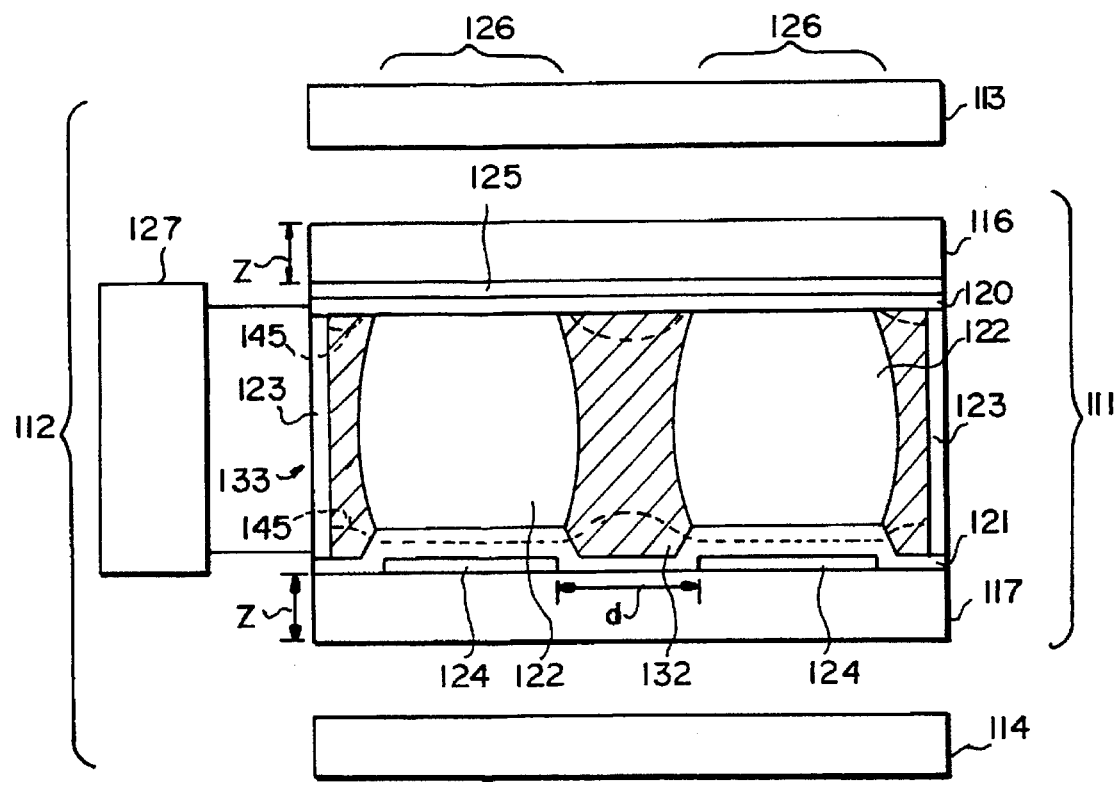
FIG. 19 is a cross-sectional view of the liquid crystal display device of Example 6.

FIG. 19 is a cross-sectional view of a liquid crystal display device 111 according to the present invention. In the liquid crystal display device 111, a plurality of pixels for a display are arranged in a matrix. A liquid crystal layer 133 is sandwiched between a pair of glass substrates 116, 117 having a thickness of z. On the glass substrate 117, pixel electrodes 124 are formed in a matrix so as to correspond to the respective pixels of the liquid crystal display device 111. Each pixel electrode 124 is provided at a distance d from each other.

In the liquid crystal display device 111, based on the distance d, a wavelength $\lambda$ of UV-rays in the glass substrates 116, 117 with respect to a wavelength 0.36 µm of UV-rays used for photopolymerization described later (as an example, 0.24 µm=wavelength of UV-rays 0.36 µm÷refractive index of glass 1.5), and the thickness z of the glass substrate 116 or 117 which is a distance between a photomask used for photopolymerization and the liquid crystal layer 133, a nondimensional parameter a is represented by the following Formula 1:

$$a=\{2/(\lambda \cdot z)\}^{1/2} \cdot d \quad (1)$$

The distance d and the thickness z are selected so that the parameter a becomes 1 or more. On the glass substrate 116, a plurality of ribbon-shaped common electrodes 125 are formed as an example.

Alignment films 120, 121 are formed on the glass substrates 116, 117 so as to cover the common electrodes 125 and the pixel electrodes 124, respectively. In the alteration of the present example, it is not required to form the alignment films 120, 121. The glass substrates 116, 117 are sealed with a sealant 23 at a peripheral portion thereof. The liquid crystal layer 133 has liquid crystal regions 122 surrounded by polymer walls 132 formed between the glass substrates 116, 117 so as to reach the alignment films 120, 121. The pixel electrodes 124, the common electrodes 125, and the liquid crystal regions 122 sandwiched between the pixel electrodes 124 and the common electrodes 125 constitute the respective pixels 126. Polarizers 113, 114 are attached to the sides of the glass substrates 116 and 117. A driving circuit 127 is connected to the respective pixel electrodes 124 and the respective common electrodes 125. A driving voltage is applied to the respective pixel electrodes 124 and the respective common electrodes 125 by the driving circuit 127, whereby a display is performed per pixel 126.

Hereinafter, a method for producing the liquid crystal display device 111 will be described.

Figure 18:
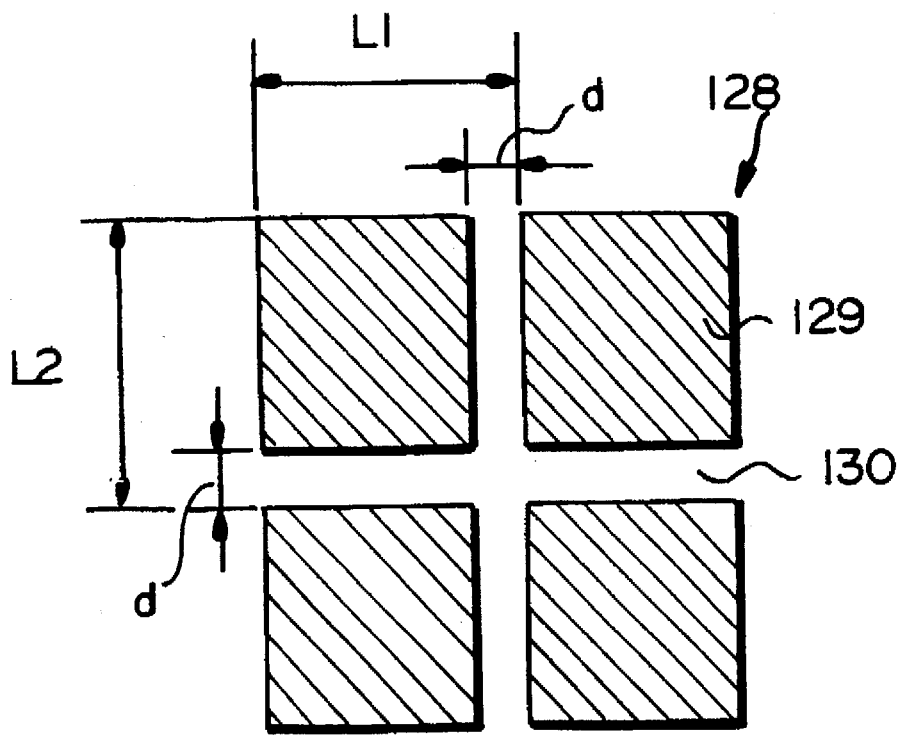
FIG. 18 is a plan view of a photomask used in the step of producing a liquid crystal display device of Example 6.
Figure 20:
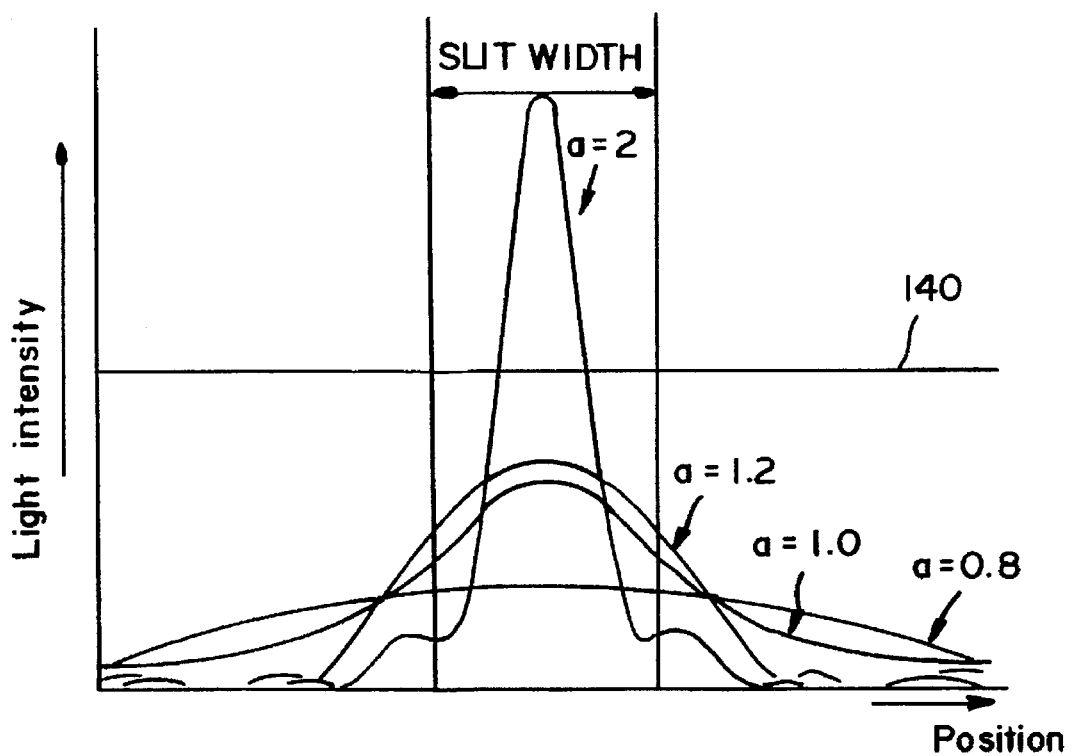
FIG. 20 is a graph illustrating the difference between Example 6, 7, and 8 and Comparative Example 5.
Figure 21:
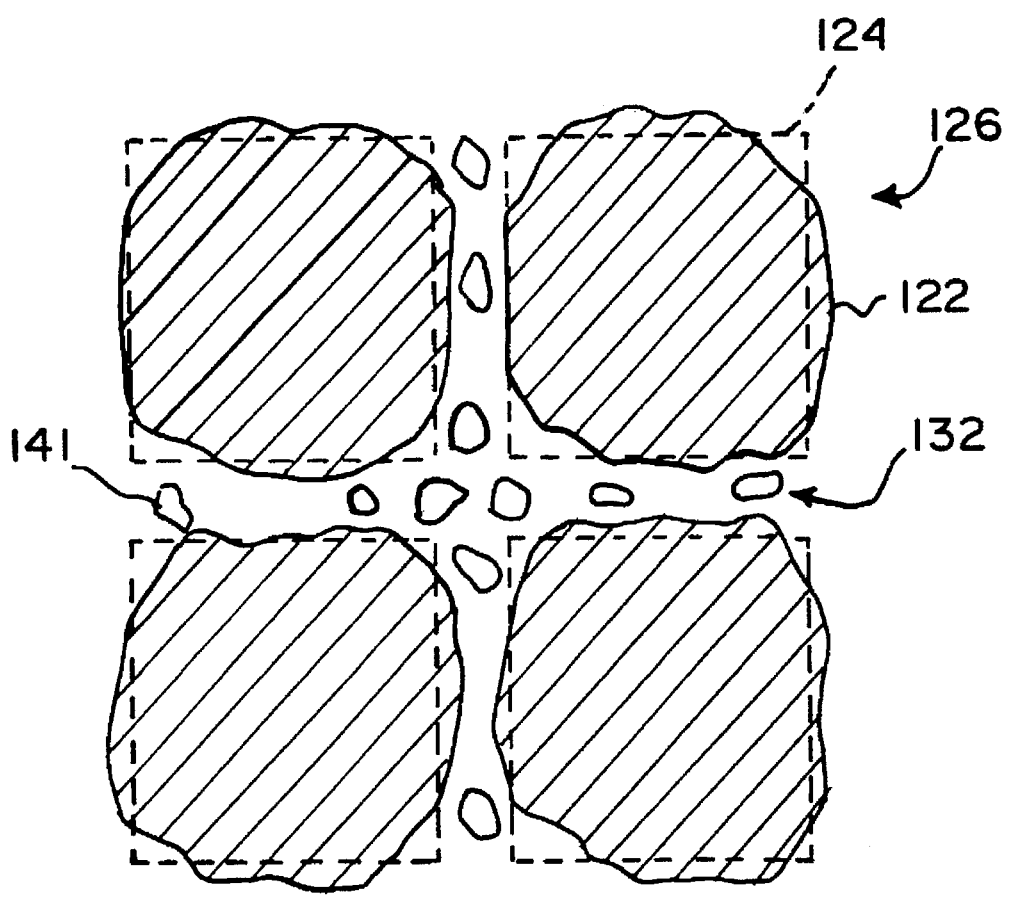
FIG. 21 is a plan view of a pixel of Example 6.
Figure 22:
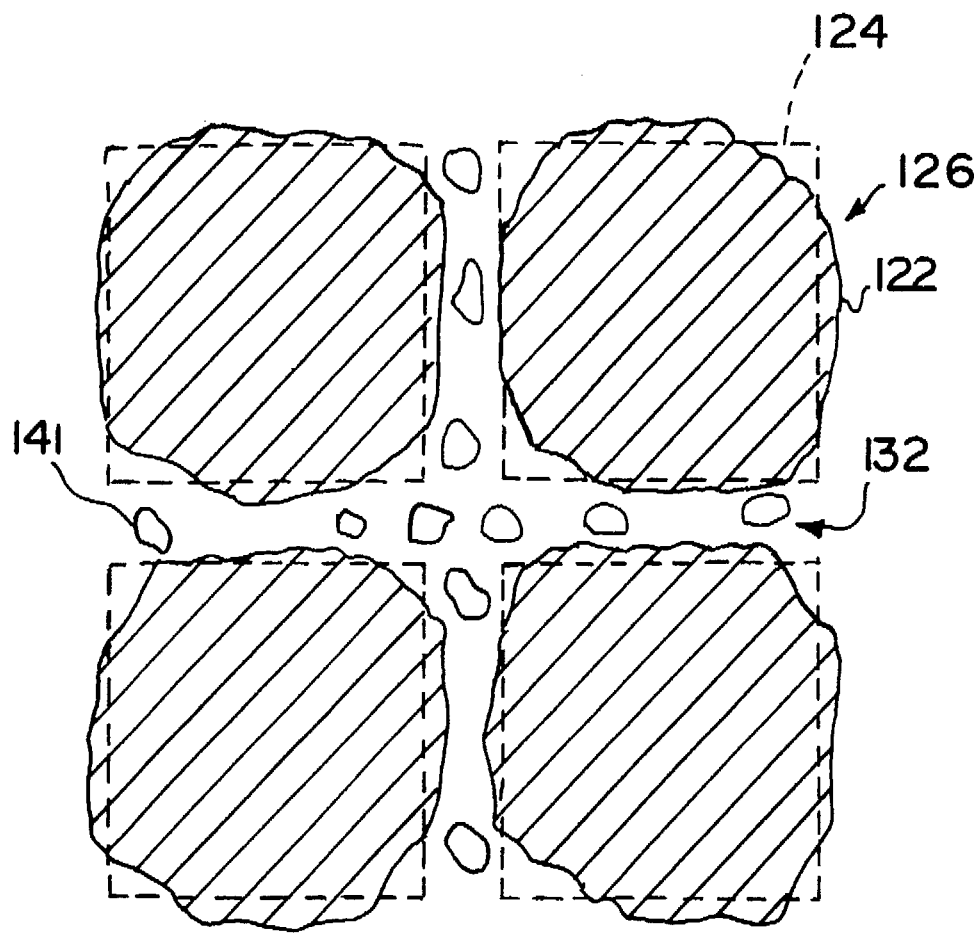
FIG. 22 is a plan view of a pixel of Example 7.
Figure 23:
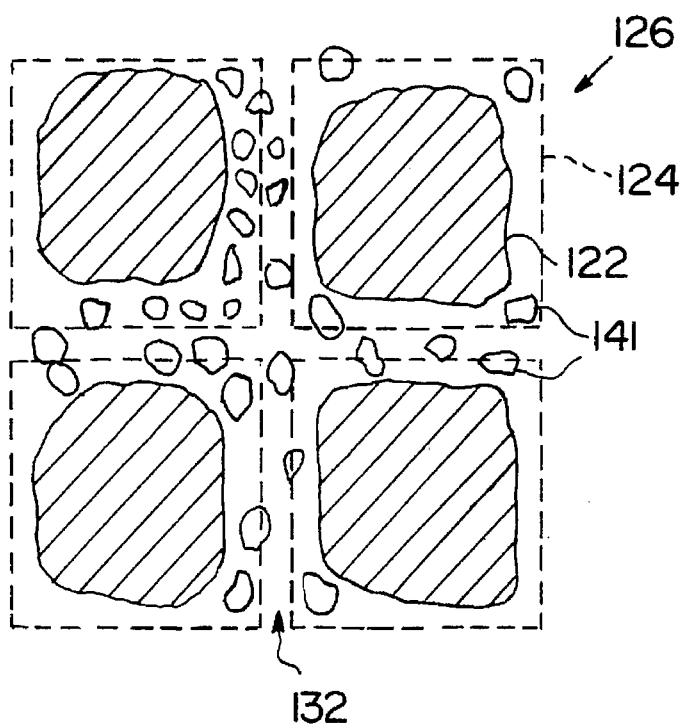
FIG. 23 is a plan view of a pixel of Example 8.
Figure 24:
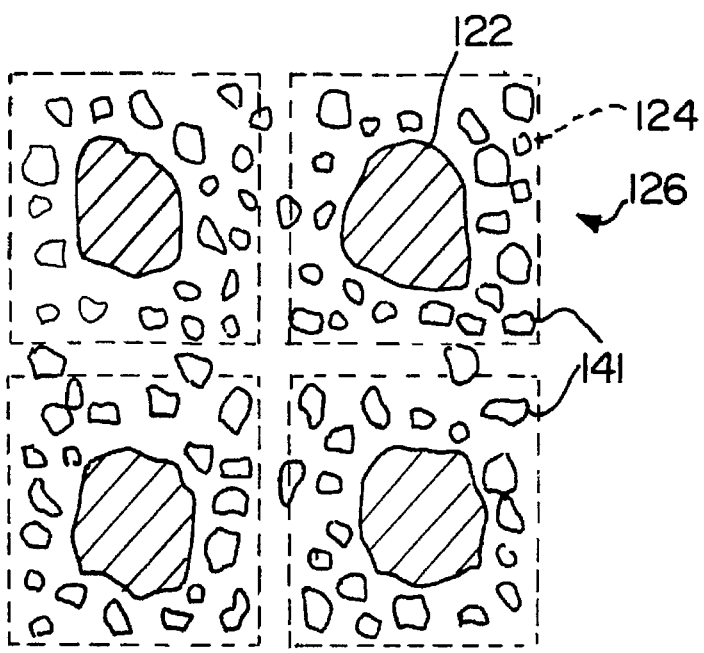
FIG. 24 is a plan view of a pixel of Comparative Example 5.

FIG. 18 is a plan view of a photomask 128 used for the production of the liquid crystal display device 111; FIG. 20 is a graph illustrating the difference between Examples 6, 7, and 8 and Comparative Example 5; FIG. 21 is a plan view of the pixel 126 of Example 6; FIG. 22 is a plan view of the pixel 126 of Example 7; FIG. 23 is a plan view of the pixel 126 of Example 8; and FIG. 24 is a plan view of the pixel 126 of Comparative Example 5.

First, the pixel electrodes 124 and the common electrodes 125 made of ITO (50 nm) were formed on the glass substrates 117, 116, respectively. Spherical, cylindrical, or fiber-shaped spacers (not shown) having a diameter of 5.5 µm were interposed between the glass substrates 116, 117 so as to keep a uniform cell thickness (i.e., distance between the pixel electrodes 124 and the common electrodes 125). Thus, a cell was fabricated. The photomask 128 shown in FIG. 18 was attached to the cell thus fabricated. The photomask 128 has a plurality of square light-shielding portions 129 (e.g., 125 µm (L1)×125 µm (L2)) arranged in a matrix. Light-transmitting portions 130 are formed in a net shape between the respective light-shielding portions 129. A slit width d between the light-shielding portions 129 was set to be 25 µm, 20 µm, 15 µm, and 10 µm, respectively in Examples 6, 7, 8, and Comparative Example 5.

According to the present examples, in the production of the liquid crystal display device, a photopolymerizable resin is cured from a homogeneous mixture of a liquid crystal material and a photopolymerizable resin to phase-separate the mixture into liquid crystal and a cured polymer; as a result, the liquid crystal regions 122 and the polymer walls 132 are formed. During the production, UV-rays are prevented from being irradiated to the pixels 126. When the distance d between the respective light-shielding portions of the photomask becomes smaller, the diffraction phenomenon of light used for irradiation cannot be ignored. Considering the diffraction phenomenon, when the distance d between the respective light-shielding portions is small or each light-shielding portion has a small width, light comes in the pixels 126 of the liquid crystal layer 133 to cure a photopolymerizable compound in the pixels 126. In order to prevent the diffraction, in the present examples, the shape of the photomask 128 or the shape of the pixels 126 is defined.

FIG. 20 shows the calculated results of light diffraction caused by the light-transmitting portions 130 in the case where the light-transmitting portions 130 of the photomask 128 is regarded as diffraction slits. The horizontal axis of the graph represents a relative position in a direction perpendicular to the extending direction of the light-transmitting portions 130 (i.e., direction in which the slit width d is defined); The vertical axis of the graph represents the intensity of light which has reached each position through the photomask 128 and the substrate. Two vertical lines in the center of the graph represent the width of the light-transmitting portion 130, i.e., the slit width d. In this figure, a horizontal line 140 represents the intensity of light to be irradiated in the absence of the photomask 128.

The light diffraction patter is characterized by the parameter a represented by Formula 1. Assuming that the wavelength of λ light in the glass substrates 116, 117 is 0.24 μm (=wavelength of UV-rays 0.36 μm÷refractive index of glass 1.5), in order to suppress or prevent the incidence of light in the pixels 126 by the diffraction, the intensity distribution of light to be irradiated to the liquid crystal regions 130 is desired to be set in such a manner that most of the light is incident within the light-transmitting portions 130. In FIG. 20, when the parameter a is less than 1 and becomes smaller, the degree of diffraction phenomenon is increased and the distribution of intensity of light irradiated to the liquid crystal regions 122 is leveled. On the other hand, when the parameter a is 1 or more and becomes larger, the distribution of intensity of light is localized in between the vertical lines. Thus, in order to suppress or prevent the incidence of light in the pixels 126 by the diffraction, it is understood from FIG. 20 that the parameter a represented by Formula 1 is 1 or more.

The slit width d and the parameter a in Examples 6, 7, and 8 and Comparative Example 5 are shown in Table 2.

TABLE 2

|  | Example 6 | Example 7 | Example 8 | Comparative Example 5 |
| --- | --- | --- | --- | --- |
| Slit width μm | 25 | 20 | 15 | 10 |
| Parameter a | 2.18 | 1.74 | 1.31 | 0.87 |

A mixture including 0.1 g of R-684 (produced by Nippon Kayaku Co., Ltd.) 0.05 g of styrene, 0.75 g of isobornyl methacrylate, 0.10 g of perfluorooctyl methacrylate, 4 g of liquid crystal material ZLI-4792 (produced by Merck & Co., Inc.) with 0.3% chiral dopant S-811 (produced by Merck & Co., Inc.) added, and 0.0025 g of photo-initiator Irugacure 651 (produced by CIBA-GEIGY Corporation) was prepared. The mixture was injected into the cell at 40° C. The cell was set under a high=pressure mercury lamp emitting parallel UV-rays at 10 mW/cm². The UV-rays were irradiated into the cell through the dot pattern of the photomask 128. The irradiation was conducted in 20 cycles, each cycle including one second irradiation and 30 seconds non-irradiation. After 20 cycles, the UV-rays were continuously irradiated to the cell for 10 minutes. The photomask 128 was removed and the UV-rays were continuously irradiated for another 10 minutes, thereby curing resin in the mixture.

Two polarizers were attached to both sides of the cell thus obtained so that the polarizing directions of the polarizers were perpendicular to each other, thereby obtaining the liquid crystal display device 111. In the liquid crystal display device 111, the liquid crystal regions 122 were surrounded by the polymer walls 132, and each liquid crystal region 122 included radially arranged liquid crystal domains. The observation of the liquid crystal display device 111 by a microscope revealed the following:

As shown in FIGS. 21 through 24, in Examples 6 through 8, the liquid crystal regions 122 were formed substantially according to the dot pattern of the photomask 128 and the position and size of the pixels 126, i.e., pixel electrodes 124. In the polymer walls 132, minute liquid crystal droplets 141 were formed. As shown in FIGS. 21 through 23, the liquid crystal region 122 in each pixel 126 became smaller in the order of Examples 6, 7, an 8. In Comparative Example 5, because of the diffraction of light, the UV-rays came in the pixels 126 which were to be light-shielded; as a result, the polymer walls 132 were also formed in the pixels 126. From there results, as shown in Table 3, in the electro-opitcal characteristics of the liquid crystal display device 11, the transmittance $V_{off}$ at an OFF voltage varies depending upon the slit width d. In particular, in Comparative Example 5, a fine polymer network was formed, so that the transmittance $V_{off}$ was decreased.

TABLE 3

|  | Example 6 | Example 7 | Example 8 | Comparative Example 5 |
| --- | --- | --- | --- | --- |
| Light Transmittance $V_{off}$ at an OFF voltage | 52% | 50% | 46% | 33% |

EXAMPLE 9 AND COMPARATIVE EXAMPLE 6

Figure 25:
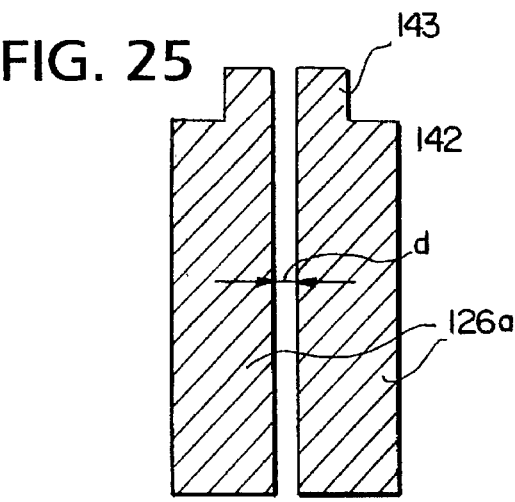
FIG. 25 is a plan view of a pixel of Example 9.
Figure 26:
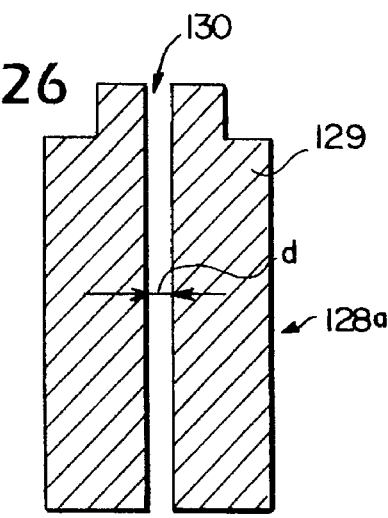
FIG. 26 is a plan view of a photomask of Example 9.
Figure 27:
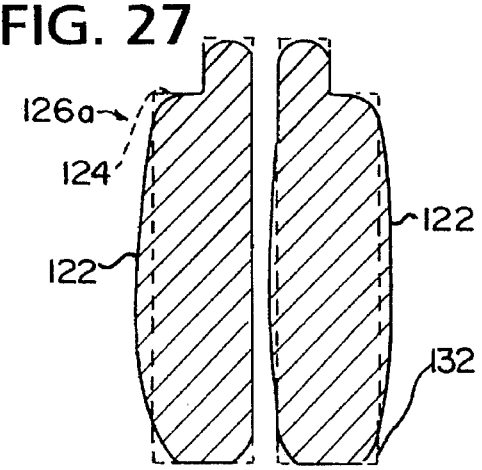
FIG. 27 is a plan view of a pixel of Example 9.
Figure 28:
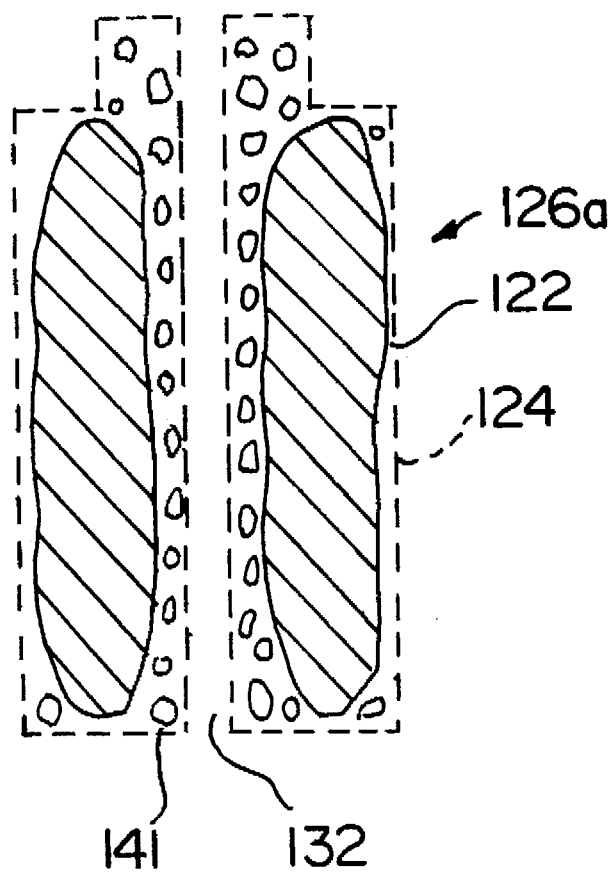
FIG. 28 is a plan view of a pixel of Comparative Example 6.

A TFT substrate having a thickness z of 1.1 mm and a counter BM substrate having a black matrix were attached to each other in the same way as in Example 6 to fabricate a TFT cell. On the TFT substrate, pixels 126a each having a rectangular portion 142 and a projected portion 143 provided at one short side of the rectangular portion 142 as shown in FIG. 25 were formed in a matrix and a plurality of TFTs for driving each pixel 126a were formed in a matrix. The same material as that of Example 6 was injected into the cell. A photomask 128a as shown in FIG. 26 was placed on the substrate side of the TFT cell so as to be aligned therewith. Under this condition, UV-rays were irradiated from the TFT substrate side to the TFT cell through the photomask 128a. The observation of the liquid crystal display device thus produced revealed the following: As shown in FIG. 27, in Example 9, the polymer walls hardly came in the pixels 126a. As shown in FIG. 28, in Comparative Example 6, the polymer walls came in the pixels 126a. Furthermore, a pair of polarizers were attached to both sides of the TFT cell so that the polarizing directions of the polarizers were perpendicular to each other, and the transmittance $V_{off}$ at an OFF voltage was measured. In this case, the transmittance of a cell having no liquid crystal layer 133 and two polarizers attached to that the polarizing directions of the polarizers are parallel with each other was set to be 100%. As a result, as shown in Table 4, transmittance was high in Example 9; however, in Comparative Example 6, transmittance was low because of the number of polymer walls present in the pixels 126a.

TABLE 4

|  | Example 9 | Comparative Example 6 |
|---|---|---|
| Light transmittance $V_{off}$ at an OFF voltage | 68% | 35% |
| Parameter a | 2.18 | 0.87 |

From Examples 6 through 9 and Comparative Examples 5 and 6, each liquid crystal display device of Examples 6 through 9 has improved contrast and display quality.

Hereinafter, the alterations of the present invention will be described.

Display Mode

The method of the present invention can be applied for producing a liquid crystal display device in which liquid crystals for various modes, such as TN liquid crystal, STN liquid crystal, ferroelectric liquid crystal, ECB mode liquid crystal, and liquid crystal in which liquid crystal domains are radially or randomly arranged, is surrounded by polymer walls.

Photocurable Resin

A useful polymer material is a photocurable resin. Examples of a photocurable resin are acrylic acid and acrylic ester having C3 or more long-chain alkyl groups or benzene rings, more specifically, isobutyl acrylate, stearyl acrylate, lauryl acrylate, isoamyl acrylate, n-butyl methacrylate, n-lauryl methacrylate, tridecyl methacrylate, 2-ethylhexyl acrylate, n-stearyl methacrylate, cyclohexyl methacrylate, benzyl methacrylate, 2-phenoxyetyl methacrylate, isobornyl acrylate, and isobornyl methacrylate; multifunctional resins having two or more functional groups in order to enhance the physical strength of a polymer, such as R-684 (a product of NIPPON KAYAKU CO., LTD.), biphenol A dimethacrylate, bisphenol A diacrylate, 1,4-butanediol dimethacrylate, 1,6-hexanediol dimethacrylate, trimethylolpropane trimethacrylate, trimethylolpropane triacrylate, tetramethylolmethane tetraacrylate, and neopentyl diacrylate; and more preferably, halide resins, for example, chloride or fluoride of these monomers, such as 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate.

Liquid Crystal Material

As the liquid crystal material used in the present invention, a mixture of organic compounds exhibiting a liquid crystal state in the vicinity of room temperature, such as nematic liquid crystal (including two-frequency drive liquid crystal, Δ ε<0) and nematic liquid crystal with cholesteric liquid crystal (chiral dopant) added is preferred because of it characteristics. In particular, liquid crystal which is more stable against chemical reactions is more desirable. Namely, liquid crystal having a functional group such as a fluorine atom in its molecule is more preferred, since photopolymerization is involved during the processing of a liquid crystal layer. Specific examples of such liquid crystal include ZLI-4801-000, ZLI-4801-001, ZLI-4792, and ZLI-4427 (produced by Merck & Co., Inc.). To select a liquid crystal material and a liquid crystal compound having a polymerizable functional group in its molecule, it is preferred that the respective portions exhibiting liquid crystallinity are similar to each other, in view of comparatibility. In particular, for F or Cl type liquid crystal materials having specific chemical properties, it is preferred that an F or Cl type liquid crystal compound having a polymerizable functional group are selected.

As the liquid crystal material in the mixture to be injected into the cell, a nematic liquid crystal material with no chiral dopant added and a nematic liquid crystal material with chiral dopant added can be used. Moreover, liquid crystal materials with a dichroic dye added can also be used.

The refractive indices of the liquid crystal material preferably satisfy the following expression:

$$|n_x - n_p| < 0.1$$

where $n_x$ is $n_e$ or $n_o$; and $n_p$ is the refractive index of a polymer mixture.

If the refractive index of the liquid crystal material is out of the above range, the mismatching of the refractive index between the liquid material and the polymer material occurs and deteriorates display quality. More preferably, $n_p$ is a value between $n_e$ and $n_o$. If the refractive index of the liquid crystal material within this range, even when the liquid crystal molecules are driven by the application of a voltage, the difference in refractive index between the liquid crystal material and the polymer material is small and light scattering phenomenon on the interface between the liquid crystal material and the polymer material is markedly decreased.

The weight ratio between the liquid crystal material and the polymerizable compound (including a liquid crystalline polymerizable compound) is preferably 50:50 to 97:3, and more preferably 70:30 to 90:10. When the proportion of the liquid crystal material is less than 50%, the amount of the polymer walls is increased and a drive voltage for the liquid crystal cell is markedly increased. Moreover, the liquid crystal regions arranged by the anchoring property of the substrate surface is reduced, resulting in the loss of practicability. When the proportion of the liquid crystal material is more than 97%, the polymer walls are not sufficiently formed and the physical strength of the liquid crystal layer is decreased, making it difficult to obtain stable performance of the device.

Photo-Initiator

As the photo-initiator, conventionally used photoinitiators such as Irugacure 184, 651, and 907, Darocure 1173, 1116, and 2959 can be used.

The proportion of the photo-initiator is preferably 0.3 to 5% based on the total amount of the mixture of the liquid crystal material and the photocurable resin. When the proportion is less than 0.3%, photopolymerization is not sufficiently effected. When the proportion is more than 5%, the phase-separation of the liquid crystal material and the polymer material proceeds too fast, making it difficult to control the size of the liquid crystal droplets to be obtained. As a result, the liquid crystal droplets are small and the drive voltage is high.

Photo-initiators which can be polymerized with visible light can also be used. Examples of such photo-initiators include Lucirin TPO (produced by BASF AG), KAYA-CURE DETX-S (produced by Nippon Kayaku Co., Ltd.), and CGI 369 (produced by CIBA-GEIGY Corporation). In the case of using this type of photo-initiator, the value of λ in the parameter a is required to be matched with the absorption wavelength of the photo-initiator. These photoinitiators are effective, particularly for allowing light having a wavelength in the vicinity of UV-rays to be absorbed by the substrate material made of plastic.

Alignment Film

As a material for the alignment film used in the present invention, organic films made of polyimide or the like, e.g., SE 150 (produced by Nissan Chemical Industries Ltd.), and organic film of another type, e.g., CYTOP (produced by Asahi Glass Co., Ltd.) or inorganic films made of SiO or the like can be used. The alignment film can be subjected to alignment treatment such as rubbing, if required. In the liquid crystal display device in which the liquid crystal domains are arranged in a random manner, a thin film having the same effect as that of the alignment film is automatically formed between the substrate and the liquid crystal regions during the production of the device, so that the alignment film can be omitted.

Driving Method

The present invention can be applied to a method for driving a liquid crystal display device such as an active drive and a duty drive using TFTs, metal-insulator-metal (MIM) as a switching element. However, the present invention is not limited thereto.

Shape of Polymer Wall

In the respective examples, although the polymer walls 132 are formed so as to reach both of the glass substrates 116, 117, the present invention is not limited thereto. Alternatively, polymer films 145 to be the alignment films 120, 121 functioning as the polymer walls 132 can be formed on the glass substrates 116, 117, as represented by a broken line of FIG. 19. In this case, the polymer films 145 formed in the portions corresponding to the polymer walls 132 are formed and have a thickness larger than that of the polymer films 145 formed in the portions corresponding to the liquid crystal regions 122.

As a material for the polymer film 145, an organic film made of a polymer alloy of a multi-component type can be used. Such a polymer alloy can be prepared by physically or chemically blending polymers. According to the physical method, different kinds of polymer components are mixed and dispersed to control a macro phase-separation structure. According to a chemical method, the formation of a molecular structure and a micro phase-separation structure are controlled by graft copolymerization, block copolymerization, and interpenetrating polymer network (IPN) method.

A block copolymer of polystyrene and polyisoprene can be used for the polymer alloy. In this case, by varying the ratio of the components, liquid crystal can be arranged in each pixel in a radial, biaxial, or multiaxial manner.

In addition, as the polymer film 145, a block copolymer such as a styrene-tetrahydrofuran block copolymer; graft copolymers such as a nylon-polypropylene graft copolymer and a polyethylene-nylon graft copolymer; IPNs such as a methyl polymethacrylate/polyethylene blend and a polystyrene/polypropylene blend; and a polymer blend such as a blend including polystyrene and styrene-polyisoprene copolymer can be used.

It was confirmed that in the case of using the polymer film 145, the liquid crystal regions 122 were formed in each pixel 126, and disclination lines were formed on the interface of each liquid crystal region 122. Thus, in the case of using the polymer film 145, the same as those obtained in the above-mentioned respective examples can be obtained.

As described above, according to the present invention, a method for producing a liquid crystal display device having a liquid crystal layer in which the liquid crystal regions are surrounded by the polymer material is provided. In particular, by suppressing the diffraction of light caused during the UV-rays irradiation, the liquid crystal regions can be formed at desired positions from a mixture of the liquid crystal material and the photopolymerizable resin (including photo-initiator, if required). Because of this structure, a liquid crystal display device having excellent contrast characteristics can be obtained.

In the liquid crystal display device of the present invention, the liquid crystal regions formed in each pixel are surrounded by the polymer material. By selecting the liquid crystal material to be used, liquid crystal display devices in various modes such as a twisted nematic (TN) mode, a super twisted nematic (STN) mode, an electrically controlled birefringenece (ECB) mode, and a ferroelectric liquid crystal (FLC) mode can be provided. When the present invention is applied to a liquid crystal display device in which the liquid crystal domains are radially or randomly arranged in each liquid crystal region, using a nematic mode, a liquid crystal display device having excellent viewing angle characteristics and high contrast characteristics can be provided. The liquid crystal display device having such excellent viewing angle characteristics can be applied to a flat-type display device used for a personal computer, a word processor, amusement equipment, and TV receiver. Alternatively, the liquid crystal display device having such excellent viewing angle characteristics can be applied to a display board, a window, a door, and a wall, using a shutter function for allowing light to transmit or shield light. Furthermore, these liquid crystal display devices have polymer walls in the cell including the liquid crystal layer sandwiched between a pair of glass substrates, so that the cell thickness is hardly changed. For this reason, these liquid crystal display devices are also suitable for a pen-input device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a liquid crystal device, comprising the steps of:

attaching a first substrate having a counter electrode to a second substrate having a plurality of pixel electrodes provided in a matrix and active elements provided for the respective pixel electrodes so that there is a predetermined gap between the counter electrode and the pixel electrodes;

injecting a mixture including liquid crystal and photocurable resin into the gap;

irradiating light to the mixture with the pixel electrodes and the active elements as non-irradiation regions thereby forming a liquid crystal layer including crystal regions surrounded by polymer walls in the respective electrodes, wherein one of the first substrate and the second substrate has a first light-shielding layer making the active elements non-irradiation regions and the pixel electrodes irradiation regions, forming a second light-shielding layer on the other substrate having no first light-shielding layer, the second light-shielding layer making the pixel electrodes non-irradiation regions; and irradiating light to the mixture through the second light-shielding layer.

2. A method for producing a liquid crystal display device according to claim 1, the second light-shielding layer is formed by a photolithograph technology on the other substrate having no first light-shielding layer, using the first light-shielding layer as a mask the second light-shielding layer making the pixel electrodes non-irradiation regions.

3. A method for producing a liquid crystal display device according to claim 2, wherein the first light-shielding layer is a black mask formed on the first substrate, the black mask having light-transmitting portions corresponding to the pixel electrodes.

4. A method for producing a liquid crystal display device according to claim 1, further comprising attaching a first and second polarizer to the first and second substrate, respectively.

5. A method for producing a liquid crystal device, comprising the steps of:

attaching a first substrate having a counter electrode to a second substrate having a plurality of pixel electrodes provided in a matrix and active elements provided for the respective pixel electrodes so that there is a predetermined gap between the counter electrode and the pixel electrodes;

injecting a mixture including liquid crystal and photocurable resin into the gap; and irradiating light to the mixture with the pixel electrodes and the active elements as non-irradiation regions thereby forming a liquid crystal layer including crystal regions surrounded by polymer walls in the respective pixel electrodes, wherein the second substrate has a light-shielding layer provided between the second substrate and the active elements making the active elements non-irradiation regions, and the liquid crystal layer is formed by placing a photomask making the pixel electrodes non-irradiation regions on a side of the substrate having the light-shielding layer and irradiating light to the mixture through the photomask.

6. A method for producing a liquid crystal display device according to claim 5, wherein the first substrate has a light shielding layer making the active elements non-irradiation regions and portions including the pixel electrodes other than the active elements irradiation regions, and the liquid crystal layer is formed by placing a photomask making the pixel electrodes non-irradiation regions on a side of the first substrate and irradiating light to the mixture through the photomask.

7. A method for producing a liquid crystal device, comprising the steps of:

attaching a first substrate having a counter electrode to a second substrate having a plurality of pixel electrodes provided in a matrix and active elements provided for the respective pixel electrodes so that there is a predetermined gap between the counter electrode and the pixel electrodes;

injecting a mixture including liquid crystal and photocurable resin into the gap;

irradiating light to the mixture with the pixel electrodes and the active elements as non-irradiation regions thereby forming a liquid crystal layer including crystal regions surrounded by polymer walls in the respective pixel electrodes, wherein the liquid crystal layer is formed by placing a photomask for making the pixel electrodes and the active elements non-irradiation regions on a side of one of the first and second substrates and irradiating light to the mixture through the photomask.

forming markers on the photomask and the substrate for aligning the photomask with the substrate; and aligning the photomask with the substrate using the markers.

8. A method for producing a liquid crystal display device according to claim 7, wherein the markers formed on the photomask and the markers formed on the substrate have no space therebetween when the photomask is aligned to the substrate.

9. A liquid crystal display device comprising:

a first substrate having a counter electrode;

a second substrate having a plurality of pixel electrodes provided in a matrix and active elements provided for the respective pixel electrodes;

a liquid crystal layer sandwiched between the counter electrode and the pixel electrodes, the liquid crystal layer including liquid crystal regions surrounded by polymer walls in the respective pixel electrodes; and a light-shielding layer provided between the second substrate and the active elements which prevents the active elements from being irradiated with light.

10. A liquid crystal display device according to claim 9, wherein the active elements include at least one of a thin film transistor and a metal insulating metal element.

11. A liquid crystal display device comprising a pair of facing substrates and a liquid crystal layer sandwiched between the pair of substrates, electrodes provided on each liquid crystal layer side of the pair of substrates forming a plurality of pixels arranged in a matrix, the liquid crystal layer being formed by irradiating light from a side of one of the substrates to a mixture including liquid crystal and photocurable resin, the liquid crystal layer including liquid crystal regions surrounded by a polymer walls in the respective pixels, wherein a parameter a represented by the following formula, using the minimum value d among distances between the pixels and widths of the pixels, a thickness z of the substrate on a side of the light irradiation, and a predetermined wavelength $\lambda$ of light in the substrate, is at least 1:

$$a = \{2/(\lambda \cdot z)\}^{1/2} \cdot d.$$

12. A liquid crystal display device according to claim 11, wherein one of the pair of substrates further including active elements in the respective pixels.

13. A liquid crystal display device according to claim 11, wherein the predetermined wavelength $\lambda$ of light in the substrate is 0.24 μm.

14. A liquid crystal display device according to claim 11, wherein the liquid crystal regions comprise a liquid crystal material having a fluorine atom in its molecule.

15. A method for producing a liquid crystal display device, comprising the steps of:

attaching a pair of substrates having electrodes to each other so that the electrodes on one of the substrates face the electrodes on the other of the substrates with a predetermined gap, thereby fabricating a cell in which the electrodes form a plurality of pixels arranged in a matrix;

injecting a mixture including liquid crystal and photocurable resin into the gap;

irradiating light having high intensity regions and low intensity regions to the mixture, thereby forming a liquid crystal layer including liquid crystal regions surrounded by polymer walls formed by the high intensity irradiating light, wherein a parameter a represented by the following formula, using the minimum value d among distances between the low intensity regions and widths of the low intensity regions, a thickness z of the substrate on a side of the light irradiation, and a wavelength $\lambda$ of the light in the substrate, is at least 1:

$$a=\{2/(\lambda \cdot z)\}^{1/2} \cdot d.$$

16. A method for producing a liquid crystal display device according to claim 15, wherein the liquid crystal layer is formed by irradiating the light to the mixture using a photomask having light-shielding portions and light-transmitting portions, and the wavelength $\lambda$ of light in the substrate is 0.24 µm.

17. A method for producing a liquid crystal device according to claim 15, further comprising forming at least one alignment film on at least one of the substrates so as to cover the electrodes.

* * * * *